(12) United States Patent
Xu et al.

(10) Patent No.: US 12,513,029 B2
(45) Date of Patent: Dec. 30, 2025

(54) CARRIER FREQUENCY TRACKING METHOD, SIGNAL TRANSMISSION METHOD, AND RELATED APPARATUS

(71) Applicant: HUAWEI TECHNOLOGIES CO., LTD., Shenzhen (CN)

(72) Inventors: Zijie Xu, Shanghai (CN); Yu Gao, Shanghai (CN); Guohua Zhou, Shanghai (CN); Jinlin Peng, Shanghai (CN); Shengyue Dou, Shanghai (CN); Yubo Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/886,729

(22) Filed: Aug. 12, 2022

(65) Prior Publication Data
US 2022/0385505 A1    Dec. 1, 2022

Related U.S. Application Data

(63) Continuation of application No. PCT/CN2021/075898, filed on Feb. 7, 2021.

(30) Foreign Application Priority Data

Feb. 14, 2020  (CN) .......................... 202010094017.3

(51) Int. Cl.
*H04L 27/00* (2006.01)
*H04L 5/00* (2006.01)
*H04W 16/10* (2009.01)

(52) U.S. Cl.
CPC ........ *H04L 27/0014* (2013.01); *H04L 5/0048* (2013.01); *H04W 16/10* (2013.01); *H04L 2027/0026* (2013.01)

(58) Field of Classification Search
None
See application file for complete search history.

(56) References Cited

U.S. PATENT DOCUMENTS 9,455,814 B2    9/2016 Kim et al.
2020/0092809 A1*    3/2020 Lee ...................... H04L 5/0053
(Continued)

FOREIGN PATENT DOCUMENTS

CN    107306177 A    10/2017
CN    109787662 A    5/2019
(Continued)

OTHER PUBLICATIONS

Intel Corporation, "Views on the demodulation requirements for NR HST-SFN scenario", 3GPP TSG-RAN WG4 Meeting #92bis, R4-1911003, Chongqing, China, Oct. 14-18, 2019, 12 pages.
(Continued)

*Primary Examiner* — Derrick W Ferris
*Assistant Examiner* — Keith Follansbee
(74) *Attorney, Agent, or Firm* — Maier & Maier, PLLC

(57) ABSTRACT

A carrier frequency tracking method, a signal transmission method, and a related apparatus. The carrier frequency tracking method includes: a terminal device receives a first tracking reference signal from a first transmission reception apparatus of a single frequency network cell; the terminal device receives a second tracking reference signal from a second transmission reception apparatus of the single frequency network cell, where the first tracking reference signal and the second tracking reference signal occupy different time-frequency resources; and the terminal device performs carrier frequency tracking based on at least one of the first tracking reference signal and the second tracking reference signal.

8 Claims, 12 Drawing Sheets

(56) References Cited

U.S. PATENT DOCUMENTS

| | | | | |
|---|---|---|---|---|
| 2020/0296625 A1* | 9/2020 | Pettersson | ............ | H04W 72/52 |
| 2021/0036741 A1* | 2/2021 | Park | .................... | H04B 7/0695 |
| 2022/0174609 A1* | 6/2022 | Kang | ................. | H04W 52/146 |
| 2023/0266427 A1* | 8/2023 | Manolakos | ........... | H04L 5/0051 |
| | | | | 370/329 |

FOREIGN PATENT DOCUMENTS

| | | |
|---|---|---|
| WO | 2014113961 A1 | 7/2014 |
| WO | 2018145104 A1 | 8/2018 |
| WO | 2018229256 A1 | 12/2018 |
| WO | 2019046005 A1 | 3/2019 |
| WO | 2019067925 A1 | 4/2019 |

OTHER PUBLICATIONS

CMCC, "Enhancements on HST-SFN deployment", R1-2008004, 3GPP TSG RAN WG1 #103-e, e-Meeting, Oct. 26-Nov. 13, 2020, 10 pages.

\* cited by examiner

CARRIER FREQUENCY TRACKING METHOD, SIGNAL TRANSMISSION METHOD, AND RELATED APPARATUS

CROSS-REFERENCE TO RELATED APPLICATIONS

This application is a continuation of International Application No. PCT/CN2021/075898, filed on Feb. 7, 2021. The International Application claims priority to Chinese Patent Application No. 202010094017.3, filed on Feb. 14, 2020. The afore-mentioned patent applications are hereby incorporated by reference in their entirety.

TECHNICAL FIELD

The embodiments relate to the field of wireless network technologies, a carrier frequency tracking method, a signal transmission method, and a related apparatus.

BACKGROUND

A physical cell is also referred to as an L1 physical cell and is a unique identification cell identified by a processing baseband resource in a baseband processing unit. Each physical cell needs to consume one demodulation resource of the baseband processing unit, that is, corresponds to one carrier resource (CR). A cell is a basic logical unit that provides a complete communication service for user equipment in a radio network. The cell is logical division of carrier resources, and therefore is also referred to as a logical cell. At an air interface layer, the UE distinguishes between different logical cells by using physical cell identifiers (PCIs). One logical cell may include one or more physical cells.

A single frequency network (SFN) allows a plurality of physical cells working in a same frequency band to be combined into one logical cell in a geographic area. All physical cells in the logical cell have a same PCI, so that handover is avoided between all the physical cells in the logical cell.

After the UE accesses a logical cell in an SFN scenario and completes initial frequency synchronization, the UE performs carrier frequency tracking based on tracking reference signals (TRSs) sent by a plurality of transmission reception points (TRPs) corresponding to the logical cell. However, in the SFN scenario, sometimes data transmission performance of the UE is poor.

SUMMARY

The embodiments may provide a carrier frequency tracking method, a signal transmission method, and a related apparatus, to improve data transmission performance of a terminal device.

According to a first aspect, an implementation provides a carrier frequency tracking method. The carrier frequency tracking method includes: A terminal device receives a first tracking reference signal from a first transmission reception apparatus of a single frequency network cell; the terminal device receives a second tracking reference signal from a second transmission reception apparatus of the single frequency network cell, where the first tracking reference signal and the second tracking reference signal occupy different time-frequency resources; and the terminal device performs carrier frequency tracking based on at least one of the first tracking reference signal and the second tracking reference signal.

In the carrier frequency tracking method in this embodiment, the terminal device can obtain a plurality of received tracking reference signals on different time-frequency resources. The terminal device can select, from the plurality of received tracking reference signals, one appropriate tracking reference signal for carrier frequency tracking, and can also obtain, based on the plurality of received tracking reference signals, a to-be-tracked carrier frequency on which the carrier frequency tracking is to be performed. However, in an existing carrier frequency tracking technology, each transmission reception apparatus sends a tracking reference signal to the terminal device on a same time-frequency resource. In other words, each transmission reception apparatus sends the same tracking reference signal to the terminal device. In this way, a carrier frequency on which carrier frequency tracking is to be performed can only be obtained based on the unique tracking reference signal. It can be understood that, in the carrier frequency tracking method, one appropriate carrier frequency on which the carrier frequency tracking is to be performed can be obtained based on the plurality of received tracking reference signals, so that the terminal device can more accurately perform carrier frequency tracking, and perform data transmission on the tracked carrier frequency, to improve data transmission performance of the terminal device.

In some embodiments, that the terminal device performs carrier frequency tracking based on at least one of the first tracking reference signal and the second tracking reference signal includes: The terminal device determines, based on the first tracking reference signal and the second tracking reference signal, a first carrier frequency on which the carrier frequency tracking is to be performed, and performs carrier frequency tracking based on the first carrier frequency. In this way, the terminal device can obtain one appropriate first carrier frequency based on the first tracking reference signal and the second tracking reference signal, so that the terminal device can better perform data transmission.

In some implementations, that the terminal device determines, based on the first tracking reference signal and the second tracking reference signal, a first carrier frequency on which carrier frequency tracking is to be performed includes: The terminal device determines a second carrier frequency corresponding to the first tracking reference signal; the terminal device determines a third carrier frequency corresponding to the second tracking reference signal; and the terminal device determines the first carrier frequency based on the second carrier frequency and the third carrier frequency. In this way, the first carrier frequency is obtained based on the second carrier frequency corresponding to the first tracking reference signal and the third carrier frequency corresponding to the second tracking reference signal, and the first carrier frequency can more accurately reflect a frequency offset between the terminal device and the first transmission reception apparatus and a frequency offset between the terminal device and the second transmission reception apparatus. The terminal device performs carrier frequency tracking based on the first carrier frequency, to better perform data transmission.

In some embodiments, that the terminal device determines the first carrier frequency based on the second carrier frequency and the third carrier frequency includes: When an absolute value of a difference between the second carrier frequency and the third carrier frequency is less than or equal to a frequency offset threshold, the terminal device determines the first carrier frequency based on the second carrier frequency and the third carrier frequency. It may be understood that, when the absolute value of the difference between the second carrier frequency and the third carrier frequency is less than the frequency offset threshold, a difference between the frequency offset between the terminal device and the first transmission reception apparatus and the frequency offset between the terminal device and the second transmission reception apparatus is not large. In this case, the terminal device may determine, based on the second carrier frequency corresponding to the first tracking reference signal sent by the first transmission reception apparatus and the third carrier frequency corresponding to the second tracking reference signal sent by the second transmission reception apparatus, the first carrier frequency on which the carrier frequency tracking is to be performed. In this way, the first carrier frequency is determined by comprehensively considering the second carrier frequency corresponding to the first tracking reference signal sent by the first transmission reception apparatus and the third carrier frequency corresponding to the second tracking reference signal sent by the second transmission reception apparatus, so that the terminal device can track, on the first carrier frequency, a carrier frequency sent by each transmission reception apparatus, to improve the data transmission performance.

In some embodiments, that the terminal device determines, based on the first tracking reference signal and the second tracking reference signal, a first carrier frequency on which carrier frequency tracking is to be performed includes: The terminal device determines a first signal to interference plus noise ratio corresponding to the first tracking reference signal; the terminal device determines a second signal to interference plus noise ratio corresponding to the second tracking reference signal; and the terminal device determines the first carrier frequency based on the first signal to interference plus noise ratio and the second signal to interference plus noise ratio, where the first carrier frequency is a second carrier frequency corresponding to the first tracking reference signal or a third carrier frequency corresponding to the second tracking reference signal. A signal to interference plus noise ratio reflects quality of a signal sent by a transmission reception apparatus corresponding to each tracking reference signal to the terminal device. The terminal device selects, from the first tracking reference signal and the second tracking reference signal based on the first signal to interference plus noise ratio of the first tracking reference signal and the second signal to interference plus noise ratio of the second tracking reference signal, one first carrier frequency as the first carrier frequency on which the carrier frequency tracking is to be performed, so that the terminal device can select a carrier frequency, with appropriate signal quality, on which the carrier frequency tracking is to be performed.

In some embodiments, that the terminal device determines the first carrier frequency based on the first signal to interference plus noise ratio and the second signal to interference plus noise ratio includes: The terminal device determines the second carrier frequency corresponding to the first tracking reference signal; the terminal device determines the third carrier frequency corresponding to the second tracking reference signal; and when an absolute value of a difference between the second carrier frequency and the third carrier frequency is greater than or equal to a frequency offset threshold, the terminal device determines the first carrier frequency based on the first signal to interference plus noise ratio and the second signal to interference plus noise ratio. It may be understood that when the absolute value of the difference between the second carrier frequency and the third carrier frequency is greater than the frequency offset threshold, a difference between a frequency offset between the terminal device and the first transmission reception apparatus and a frequency offset between the terminal device and the second transmission reception apparatus is large. The terminal device selects one carrier frequency to track, so that it can be ensured that a carrier frequency sent by one transmission reception apparatus is better tracked.

In some embodiments, the carrier frequency tracking method further includes: The terminal device sends feedback information, where the feedback information is for indicating to silence a transmission reception apparatus other than a transmission reception apparatus corresponding to the first carrier frequency. After transmission reception apparatuses in an SFN cell receive the feedback information, the transmission reception apparatus other than the transmission reception apparatus corresponding to the first carrier frequency is silenced, so that resources can be saved.

In some implementations, the carrier frequency tracking method further includes: The terminal device sends carrier frequency tracking information, where the carrier frequency tracking information is for feeding back that the terminal device performs carrier frequency tracking based on the first carrier frequency. In this way, a network processing device of the SFN cell can receive the carrier frequency tracking information through at least one transmission reception apparatus, and determine a frequency offset between each transmission reception apparatus and the terminal device based on the first carrier frequency indicated by the carrier frequency tracking information and a carrier frequency of an uplink reference signal that is sent by the terminal and that is received by each transmission reception apparatus. In this way, the network processing device can perform pre-compensation based on the frequency offset between each transmission reception apparatus and the terminal device. When a transmission reception apparatus sends downlink data, the network processing device first performs pre-compensation based on a frequency offset between the transmission reception apparatus and the terminal device. In this way, a carrier frequency of the downlink data received by the terminal device is pre-compensated based on the frequency offset, so that the terminal device can perform data transmission on a carrier frequency configured by using higher layer signaling.

In some implementations, that the terminal device performs carrier frequency tracking based on at least one of the first tracking reference signal and the second tracking reference signal includes: The terminal device receives indication information from the first transmission reception apparatus or the second transmission reception apparatus, where the indication information indicates a tracking reference signal for carrier frequency tracking, and the tracking reference signal for carrier frequency tracking is the first tracking reference signal or the second tracking reference signal; and the terminal device performs, in response to the indication information, carrier frequency tracking based on the tracking reference signal for carrier frequency tracking. In this way, the terminal device can select, from the plurality of received tracking reference signals, a tracking reference signal that is indicated by indication information sent by a transmission reception apparatus on a network side and that is for carrier frequency tracking, so that the terminal device can perform carrier frequency tracking based on an appropriate carrier frequency.

In some implementations, the carrier frequency tracking method further includes: The terminal device sends an uplink reference signal, where reference signal received power of the uplink reference signal at the first transmission reception apparatus and reference signal received power of the uplink reference signal at the second transmission reception apparatus are for determining the tracking reference signal for carrier frequency tracking. Transmit power of uplink reference signals received by transmission reception apparatuses is the same. However, a path loss is caused in a transmission process of uplink power. Positions of the transmission reception apparatuses are different. Transmission paths and path losses of the uplink reference signals received by the transmission reception apparatuses are different. Therefore, receive power of the uplink reference signals received by the transmission reception apparatuses is different. In this case, a network processing device of the single frequency network cell may determine, based on the receive power of the uplink reference signals received by the transmission reception apparatuses, to use the tracking reference signal sent by the first transmission reception apparatus or the tracking reference signal sent by the second transmission reception apparatus as the tracking reference signal for carrier frequency tracking. In this way, the terminal device can perform carrier frequency tracking based on a carrier frequency with highest signal strength.

In some embodiments, the carrier frequency tracking method further includes: The terminal device sends an uplink reference signal, where a frequency offset value of the uplink reference signal at the first transmission reception apparatus and a frequency offset value of the uplink reference signal at the second transmission reception apparatus are for determining the tracking reference signal for carrier frequency tracking. In this way, a network processing device of the single frequency network cell can select, based on a first frequency offset and a second frequency offset, a tracking reference signal sent by a transmission reception apparatus as the tracking reference signal for carrier frequency tracking, where a frequency offset between the transmission reception apparatus and the terminal device is the smallest. For example, when the network processing device determines, based on the first frequency offset and the second frequency offset, that a frequency offset between the terminal device and the first transmission reception apparatus is the smallest, the network processing device may determine that the first tracking reference signal sent by the first transmission reception apparatus is the tracking reference signal for carrier frequency tracking. Alternatively, the network processing device may perform, based on the first frequency offset, pre-compensation on a carrier frequency on which the first transmission reception apparatus sends downlink data, and determine that the tracking reference signal for carrier frequency tracking is the first tracking reference signal; or perform, based on the second frequency offset, pre-compensation on a carrier frequency on which the second transmission reception apparatus sends downlink data, and determine that the tracking reference signal for carrier frequency tracking is the second tracking reference signal. In this way, a frequency offset of the downlink data received by the terminal device is 0, to improve data transmission performance of the terminal device.

In some embodiments, a distance between the terminal device and the first transmission reception apparatus and a distance between the terminal device and the second transmission reception apparatus are for determining the tracking reference signal for carrier frequency tracking. In this way, the terminal device can perform carrier frequency tracking based on a tracking reference signal sent by a transmission reception apparatus closest to the terminal device, to improve data transmission performance of the terminal device.

In some embodiments, that the terminal device receives indication information from the first transmission reception apparatus or the second transmission reception apparatus includes: The terminal device receives radio resource control signaling, media access control control element (MAC CE) signaling, or downlink control information signaling from the first transmission reception apparatus or the second transmission reception apparatus, where the radio resource control signaling, the MAC CE signaling, or the downlink control information signaling includes the indication information.

In some embodiments, the indication information includes a tracking reference signal index, a channel state information reference signal resource, or a tracking reference signal resource identifier.

In some implementations, the indication information includes downlink control information. When the downlink control information is from the first transmission reception apparatus, the downlink control information indicates that the tracking reference signal for carrier frequency tracking is the first tracking reference signal. Alternatively, when the downlink control information is from the second transmission reception apparatus, the downlink control information indicates that the tracking reference signal for carrier frequency tracking is the second tracking reference signal. In this way, a case in which the indication information directly includes related information indicating the carrier frequency tracking can be avoided, so that wireless transmission resources can be saved.

According to a second aspect, an embodiment provides a carrier frequency tracking method. The carrier frequency tracking method includes: A terminal device receives a first tracking reference signal from a transmission reception apparatus; the terminal device sends an uplink reference signal to the transmission reception apparatus based on a first receive carrier frequency, where the first receive carrier frequency is a carrier frequency of the first tracking reference signal at the terminal device; the terminal device receives a second tracking reference signal sent by the transmission reception apparatus on a second carrier frequency, where the second carrier frequency=(3/2 first carrier frequency−1/2 second receive carrier frequency), the second receive carrier frequency is a carrier frequency of the uplink reference signal at the transmission reception apparatus, and the first tracking reference signal and the second tracking reference signal occupy different time-frequency resources; and the terminal device performs carrier frequency tracking based on the second tracking reference signal.

In this way, the transmission reception apparatus separately sends the first tracking reference signal and the second tracking reference signal on two different time-frequency resources. In this way, the terminal device can send the uplink reference signal based on the first tracking reference signal, so that the transmission reception apparatus accurately obtains a frequency offset between the transmission reception apparatus and the terminal device. The transmission reception apparatus accurately performs pre-compensation on a carrier frequency of the second tracking reference signal based on the frequency offset, and then sends the second tracking reference signal to the terminal device on an adjusted carrier frequency, so that the terminal device can accurately perform carrier frequency tracking based on the second tracking reference signal, to implement carrier frequency tracking without the frequency offset.

According to a third aspect, an embodiment provides a signal transmission method. The signal transmission method includes: A network processing device of a single frequency network cell sends a first tracking reference signal to a terminal device through a first transmission reception apparatus; and the network processing device sends a second tracking reference signal to the terminal device through a second transmission reception apparatus, where the first tracking reference signal and the second tracking reference signal occupy different time-frequency resources, and at least one of the first tracking reference signal and the second tracking reference signal is used by the terminal device to perform carrier frequency tracking.

In this way, the terminal device can obtain a plurality of received tracking reference signals on different time-frequency resources. The terminal device can select, from the plurality of received tracking reference signals, one appropriate tracking reference signal for carrier frequency tracking, and can also obtain, based on the plurality of received tracking reference signals, a to-be-tracked carrier frequency on which the carrier frequency tracking is to be performed, so that the terminal device can more accurately perform carrier frequency tracking, and perform data transmission on the tracked carrier frequency, to improve data transmission performance of the terminal device. The network processing device of the single frequency network cell may be a BBU of the single frequency network cell.

In some implementations, the method further includes: The network processing device receives feedback information from the terminal device, where the feedback information is for indicating to silence a transmission reception apparatus other than a transmission reception apparatus corresponding to a first carrier frequency, and the first carrier frequency is a carrier frequency of the first tracking reference signal at the terminal device or a carrier frequency of the second tracking reference signal at the terminal device. After transmission reception apparatuses in an SFN cell receive the feedback information, the transmission reception apparatus other than the transmission reception apparatus corresponding to the first carrier frequency is silenced, so that resources can be saved.

In some implementations, the method further includes: The network processing device receives carrier frequency tracking information from the terminal device, where the carrier frequency tracking information is for feeding back that the terminal device performs carrier frequency tracking based on the first carrier frequency, and the first carrier frequency is determined based on at least one of the first tracking reference signal or the second tracking reference signal. In this way, the network processing device can receive the carrier frequency tracking information through at least one transmission reception apparatus, and determine a frequency offset between each transmission reception apparatus and the terminal device based on the first carrier frequency indicated by the carrier frequency tracking information and a carrier frequency of an uplink reference signal that is sent by the terminal and that is received by each transmission reception apparatus. In this way, the network processing device can perform pre-compensation based on the frequency offset between each transmission reception apparatus and the terminal device. When a transmission reception apparatus sends downlink data, the network processing device first performs pre-compensation based on a frequency offset between the transmission reception apparatus and the terminal device. In this way, a carrier frequency of the downlink data received by the terminal device is pre-compensated based on the frequency offset, so that the terminal device can perform data transmission on a carrier frequency configured by using higher layer signaling.

In some implementations, the method further includes: The network processing device sends indication information to the terminal device, where the indication information indicates a tracking reference signal for carrier frequency tracking, and the tracking reference signal for carrier frequency tracking is the first tracking reference signal or the second tracking reference signal. In this way, the terminal device can select, from the plurality of received tracking reference signals, a tracking reference signal that is indicated by indication information sent by a transmission reception apparatus on a network side and that is for carrier frequency tracking, so that the terminal device can perform carrier frequency tracking based on an appropriate carrier frequency.

In some implementations, the method further includes: The network processing device receives an uplink reference signal from the terminal device through the first transmission reception apparatus, and the network processing device receives the uplink reference signal through the second transmission reception apparatus, where reference signal received power of the uplink reference signal at the first transmission reception apparatus and reference signal received power of the uplink reference signal at the second transmission reception apparatus are for determining the tracking reference signal for carrier frequency tracking. Transmit power of uplink reference signals received by transmission reception apparatuses is the same. However, a path loss is caused in a transmission process of uplink power. Positions of the transmission reception apparatuses are different. Transmission paths and path losses of the uplink reference signals received by the transmission reception apparatuses are different. Therefore, receive power of the uplink reference signals received by the transmission reception apparatuses is different. In this case, the network processing device may determine, based on the receive power of the uplink reference signals received by the transmission reception apparatuses, to use the tracking reference signal sent by the first transmission reception apparatus or the tracking reference signal sent by the second transmission reception apparatus as the tracking reference signal for carrier frequency tracking. In this way, the terminal device can perform carrier frequency tracking based on a carrier frequency with highest signal strength.

In some embodiments, the method further includes: The network processing device receives an uplink reference signal from the terminal device through the first transmission reception apparatus, and the network processing device receives the uplink reference signal through the second transmission reception apparatus, where a frequency offset value of the uplink reference signal at the first transmission reception apparatus and a frequency offset value of the uplink reference signal at the second transmission reception apparatus are for determining the tracking reference signal for carrier frequency tracking. In this way, the network processing device can select, based on a first frequency offset and a second frequency offset, a tracking reference signal sent by a transmission reception apparatus as the tracking reference signal for carrier frequency tracking, where a frequency offset between the transmission reception apparatus and the terminal device is the smallest. For example, when the network processing device determines, based on the first frequency offset and the second frequency offset, that a frequency offset between the terminal device and the first transmission reception apparatus is the smallest, the network processing device may determine that the first tracking reference signal sent by the first transmission reception apparatus is the tracking reference signal for carrier frequency tracking. Alternatively, the network processing device may perform, based on the first frequency offset, pre-compensation on a carrier frequency on which the first transmission reception apparatus sends downlink data, and determine that the tracking reference signal for carrier frequency tracking is the first tracking reference signal; or perform, based on the second frequency offset, pre-compensation on a carrier frequency on which the second transmission reception apparatus sends downlink data, and determine that the tracking reference signal for carrier frequency tracking is the second tracking reference signal. In this way, a frequency offset of the downlink data received by the terminal device is 0, to improve data transmission performance of the terminal device.

In some embodiments, a distance between the terminal device and the first transmission reception apparatus and a distance between the terminal device and the second transmission reception apparatus are for determining the tracking reference signal for carrier frequency tracking. In this way, the terminal device can perform carrier frequency tracking based on a tracking reference signal sent by a transmission reception apparatus closest to the terminal device, to improve data transmission performance of the terminal device.

In some embodiments, that the network processing device sends indication information to the terminal device includes: The network processing device sends radio resource control signaling, MAC CE signaling, or downlink control information signaling to the terminal device, where the radio resource control signaling, the MAC CE signaling, or the downlink control information signaling includes the indication information.

In some embodiments, the indication information includes a tracking reference signal index, a channel state information reference signal resource, or a tracking reference signal resource identifier.

In some embodiments, the indication information includes downlink control information. When the network processing device sends the downlink control information to the terminal device through the first transmission reception apparatus, the downlink control information indicates that the tracking reference signal for carrier frequency tracking is the first tracking reference signal. Alternatively, when the network processing device sends the downlink control information to the terminal device through the second transmission reception apparatus, the downlink control information indicates that the tracking reference signal for carrier frequency tracking is the second tracking reference signal. In this way, a case in which the indication information directly includes related information indicating the carrier frequency tracking can be avoided, so that wireless transmission resources can be saved.

According to a fourth aspect, the embodiments may provide a carrier frequency tracking method. The carrier frequency tracking method includes: A terminal device receives a first tracking reference signal from a transmission reception apparatus; the terminal device sends an uplink reference signal to the transmission reception apparatus based on a first receive carrier frequency, where the first receive carrier frequency is a carrier frequency of the first tracking reference signal at the terminal device; the terminal device receives a second tracking reference signal sent by the transmission reception apparatus on a second carrier frequency, where the second carrier frequency=(3/2 first carrier frequency−1/2 second receive carrier frequency), the second receive carrier frequency is a carrier frequency of the uplink reference signal at the transmission reception apparatus, and the first tracking reference signal and the second tracking reference signal occupy different time-frequency resources; and the terminal device performs carrier frequency tracking based on the second tracking reference signal. In this way, the terminal device can send the uplink reference signal based on the first tracking reference signal, so that the transmission reception apparatus accurately obtains a frequency offset between the transmission reception apparatus and the terminal device. The transmission reception apparatus accurately performs pre-compensation on a carrier frequency of the second tracking reference signal based on the frequency offset, and then sends the second tracking reference signal to the terminal device on an adjusted carrier frequency, so that the terminal device can accurately perform carrier frequency tracking based on the second tracking reference signal, to implement carrier frequency tracking without the frequency offset.

According to a fifth aspect, an embodiment may further provide a terminal device, including a processing unit and a transceiver unit.

The transceiver unit is configured to: receive a first tracking reference signal from a first transmission reception apparatus of a single frequency network cell, and receive a second tracking reference signal from a second transmission reception apparatus of the single frequency network cell, where the first tracking reference signal and the second tracking reference signal occupy different time-frequency resources.

The processing unit is configured to perform carrier frequency tracking based on at least one of the first tracking reference signal and the second tracking reference signal.

In this way, the terminal device can obtain a plurality of received tracking reference signals on different time-frequency resources. The terminal device can select, from the plurality of received tracking reference signals, one appropriate tracking reference signal for carrier frequency tracking, and can also obtain, based on the plurality of received tracking reference signals, a to-be-tracked carrier frequency on which the carrier frequency tracking is to be performed, so that the terminal device can more accurately perform carrier frequency tracking, and perform data transmission on the tracked carrier frequency, to improve data transmission performance of the terminal device.

In some embodiments, in terms of performing, by the terminal device, carrier frequency tracking based on at least one of the first tracking reference signal and the second tracking reference signal, the processing unit is configured to: determine, based on the first tracking reference signal and the second tracking reference signal, a first carrier frequency on which the carrier frequency tracking is to be performed, and perform carrier frequency tracking based on the first carrier frequency.

In some embodiments, in terms of determining, by the terminal device based on the first tracking reference signal and the second tracking reference signal, the first carrier frequency on which the carrier frequency tracking is to be performed, the processing unit is configured to: determine a second carrier frequency corresponding to the first tracking reference signal; determine a third carrier frequency corresponding to the second tracking reference signal; and determine the first carrier frequency based on the second carrier frequency and the third carrier frequency.

In some embodiments, in terms of determining, by the terminal device, the first carrier frequency based on the second carrier frequency and the third carrier frequency, the processing unit is configured to: when an absolute value of a difference between the second carrier frequency and the third carrier frequency is less than or equal to a frequency offset threshold, determine the first carrier frequency based on the second carrier frequency and the third carrier frequency.

In some embodiments, in terms of determining, by the terminal device based on the first tracking reference signal and the second tracking reference signal, the first carrier frequency on which the carrier frequency tracking is to be performed, the processing unit is configured to: determine a first signal to interference plus noise ratio corresponding to the first tracking reference signal; determine a second signal to interference plus noise ratio corresponding to the second tracking reference signal; and determine the first carrier frequency based on the first signal to interference plus noise ratio and the second signal to interference plus noise ratio, where the first carrier frequency is a second carrier frequency corresponding to the first tracking reference signal or a third carrier frequency corresponding to the second tracking reference signal.

In some embodiments, in terms of determining, by the terminal device, the first carrier frequency based on the first signal to interference plus noise ratio and the second signal to interference plus noise ratio, the processing unit is configured to: determine the second carrier frequency corresponding to the first tracking reference signal; determine the third carrier frequency corresponding to the second tracking reference signal; and when an absolute value of a difference between the second carrier frequency and the third carrier frequency is greater than or equal to a frequency offset threshold, determine the first carrier frequency based on the first signal to interference plus noise ratio and the second signal to interference plus noise ratio.

In some embodiments, the transceiver unit is further configured to send feedback information, where the feedback information is for indicating to silence a transmission reception apparatus other than a transmission reception apparatus corresponding to the first carrier frequency.

In some embodiments, the transceiver unit is further configured to send carrier frequency tracking information, where the carrier frequency tracking information is for feeding back that the terminal device performs carrier frequency tracking based on the first carrier frequency.

In some embodiments, in terms of performing, by the terminal device, carrier frequency tracking based on at least one of the first tracking reference signal and the second tracking reference signal, the transceiver unit is configured to: receive indication information from the first transmission reception apparatus or the second transmission reception apparatus, where the indication information indicates a tracking reference signal for carrier frequency tracking, and the tracking reference signal for carrier frequency tracking is the first tracking reference signal or the second tracking reference signal; and perform, in response to the indication information, carrier frequency tracking based on the tracking reference signal for carrier frequency tracking.

In some embodiments, the transceiver unit is further configured to send an uplink reference signal, where reference signal received power of the uplink reference signal at the first transmission reception apparatus and reference signal received power of the uplink reference signal at the second transmission reception apparatus are for determining the tracking reference signal for carrier frequency tracking.

In some embodiments, the transceiver unit is further configured to send an uplink reference signal, where a frequency offset value of the uplink reference signal at the first transmission reception apparatus and a frequency offset value of the uplink reference signal at the second transmission reception apparatus are for determining the tracking reference signal for carrier frequency tracking.

In some embodiments, a distance between the terminal device and the first transmission reception apparatus and a distance between the terminal device and the second transmission reception apparatus are for determining the tracking reference signal for carrier frequency tracking.

In some embodiments, that the terminal device receives indication information from the first transmission reception apparatus or the second transmission reception apparatus includes: The terminal device receives radio resource control signaling, MAC CE signaling, or downlink control information signaling from the first transmission reception apparatus or the second transmission reception apparatus, where the radio resource control signaling, the MAC CE signaling, or the downlink control information signaling includes the indication information.

In some embodiments, the indication information includes a tracking reference signal index, a channel state information reference signal resource, or a tracking reference signal resource identifier.

In some embodiments, the indication information includes downlink control information. When the downlink control information is from the first transmission reception apparatus, the downlink control information indicates that the tracking reference signal for carrier frequency tracking is the first tracking reference signal. Alternatively, when the downlink control information is from the second transmission reception apparatus, the downlink control information indicates that the tracking reference signal for carrier frequency tracking is the second tracking reference signal.

It should be noted that the embodiments of the carrier frequency tracking method in the first aspect are also applicable to the terminal device in this embodiment. To avoid redundancy, details are not described herein again.

According to a sixth aspect, an embodiment may further provide a transmission reception apparatus, including a transceiver unit. The transceiver unit is configured to:

send a first tracking reference signal to a terminal device on a first carrier frequency;

receive an uplink reference signal sent by the terminal device based on a first receive carrier frequency, where the first receive carrier frequency is a carrier frequency of the first tracking reference signal at the terminal device; and send a second tracking reference signal to the terminal device on a second carrier frequency based on a second receive carrier frequency of the received uplink reference signal, where the first tracking reference signal and the second tracking reference signal occupy different time-frequency resources, the second tracking reference signal is for carrier frequency tracking frequency, and the second carrier frequency=(3/2 first carrier frequency−1/2 second receive carrier frequency).

In this way, the transmission reception apparatus separately sends the first tracking reference signal and the second tracking reference signal on two different time-frequency resources. In this way, the terminal device can send the uplink reference signal based on the first tracking reference signal, so that the transmission reception apparatus accurately obtains a frequency offset between the transmission reception apparatus and the terminal device. The transmission reception apparatus accurately performs pre-compensation on a carrier frequency of the second tracking reference signal based on the frequency offset, and then sends the second tracking reference signal to the terminal device on an adjusted carrier frequency, so that the terminal device can accurately perform carrier frequency tracking based on the second tracking reference signal, to implement carrier frequency tracking without the frequency offset.

According to a seventh aspect, an embodiment may further provide a network processing device. The network device is used in a single frequency network cell, and the network processing device includes a processing unit and a transceiver unit. The processing unit is configured to: control the transceiver unit to send a first tracking reference signal to a terminal device through a first transmission reception apparatus, and control the transceiver unit to send a second tracking reference signal to the terminal device through a second transmission reception apparatus, where the first tracking reference signal and the second tracking reference signal occupy different time-frequency resources, and at least one of the first tracking reference signal and the second tracking reference signal is used by the terminal device to perform carrier frequency tracking.

In this way, the terminal device can obtain a plurality of received tracking reference signals on different time-frequency resources. The terminal device can select, from the plurality of received tracking reference signals, one appropriate tracking reference signal for carrier frequency tracking, and can also obtain, based on the plurality of received tracking reference signals, a to-be-tracked carrier frequency on which the carrier frequency tracking is to be performed, so that the terminal device can more accurately perform carrier frequency tracking, and perform data transmission on the tracked carrier frequency, to improve data transmission performance of the terminal device. The network processing device of the single frequency network cell may be a BBU of the single frequency network cell.

In some embodiments, the processing unit is further configured to control the transceiver unit to receive feedback information from the terminal device through the first transmission reception apparatus or the second transmission reception apparatus, where the feedback information is for indicating to silence a transmission reception apparatus other than a transmission reception apparatus corresponding to a first carrier frequency, and the first carrier frequency is a carrier frequency of the first tracking reference signal at the terminal device or a carrier frequency of the second tracking reference signal at the terminal device.

In some embodiments, the processing unit is further configured to control the transceiver unit to receive carrier frequency tracking information from the terminal device, where the carrier frequency tracking information is for feeding back that the terminal device performs carrier frequency tracking based on the first carrier frequency, and the first carrier frequency is determined based on at least one of the first tracking reference signal or the second tracking reference signal.

In some embodiments, the processing unit is further configured to control the transceiver unit to send indication information to the terminal device, where the indication information indicates a tracking reference signal for carrier frequency tracking, and the tracking reference signal for carrier frequency tracking is the first tracking reference signal or the second tracking reference signal.

In some embodiments, the processing unit is further configured to: control the transceiver unit to receive an uplink reference signal from the terminal device through the first transmission reception apparatus, and control the transceiver unit to receive the uplink reference signal through the second transmission reception apparatus, where reference signal received power of the uplink reference signal at the first transmission reception apparatus and reference signal received power of the uplink reference signal at the second transmission reception apparatus are for determining the tracking reference signal for carrier frequency tracking.

In some embodiments, the processing unit is further configured to: control the transceiver unit to receive an uplink reference signal from the terminal device through the first transmission reception apparatus, and control the transceiver unit to receive the uplink reference signal through the second transmission reception apparatus, where a frequency offset value of the uplink reference signal at the first transmission reception apparatus and a frequency offset value of the uplink reference signal at the second transmission reception apparatus are for determining the tracking reference signal for carrier frequency tracking.

In some embodiments, a distance between the terminal device and the first transmission reception apparatus and a distance between the terminal device and the second transmission reception apparatus are for determining the tracking reference signal for carrier frequency tracking.

In some embodiments, in terms of controlling the transceiver unit to send the indication information to the terminal device, the processing unit is configured to:
control the transceiver unit to send radio resource control signaling, MAC CE signaling, or downlink control information signaling to the terminal device, where the radio resource control signaling, the MAC CE signaling, or the downlink control information signaling includes the indication information.

In some embodiments, the indication information includes a tracking reference signal index, a channel state information reference signal resource, or a tracking reference signal resource identifier.

In some embodiments, the indication information includes downlink control information. When the downlink control information is sent to the terminal device through the first transmission reception apparatus, the downlink control information indicates that the tracking reference signal for carrier frequency tracking is the first tracking reference signal. Alternatively, when the downlink control information is sent to the terminal device through the second transmission reception apparatus, the downlink control information indicates that the tracking reference signal for carrier frequency tracking is the second tracking reference signal.

It should be noted that, for the embodiments of the network processing device in the seventh aspect, refer to the embodiments of the signal transmission method in the third aspect. To avoid redundancy, details are not described herein again.

According to an eighth aspect, an embodiment may further provide a terminal device, including a transceiver unit and a processing unit.

The transceiver unit is configured to: receive, by a transmission reception apparatus, a first tracking reference signal; send an uplink reference signal to a transmission reception apparatus based on a first receive carrier frequency, where the first receive carrier frequency is a carrier frequency of the first tracking reference signal at the terminal device; and receive a second tracking reference signal sent by the transmission reception apparatus on a second carrier frequency, where the second carrier frequency=(3/2 first carrier frequency−1/2 second receive carrier frequency), the second receive carrier frequency is a carrier frequency of the uplink reference signal at the transmission reception apparatus, and the first tracking reference signal and the second tracking reference signal occupy different time-frequency resources.

The processing unit is configured to perform carrier frequency tracking based on the second tracking reference signal.

In this way, the terminal device can send the uplink reference signal based on the first tracking reference signal, so that the transmission reception apparatus accurately obtains a frequency offset between the transmission reception apparatus and the terminal device. The transmission reception apparatus accurately performs pre-compensation on a carrier frequency of the second tracking reference signal based on the frequency offset, and then sends the second tracking reference signal to the terminal device on an adjusted carrier frequency, so that the terminal device can accurately perform carrier frequency tracking based on the second tracking reference signal, to implement carrier frequency tracking without the frequency offset.

According to a ninth aspect, an embodiment may further provide a terminal device. The terminal device includes a processor and a memory. The memory stores computer instructions, and the processor executes the computer instructions stored in the memory, to enable the terminal device to perform the method according to any embodiment of the first aspect or the fourth aspect.

According to a tenth aspect, an embodiment may further provide a network device. The network device includes a processor and a memory. The memory stores computer instructions, and the processor executes the computer instructions stored in the memory, to enable a transmission reception apparatus to perform the method according to the embodiments of the second aspect.

According to an eleventh aspect, an embodiment may further provide a network processing device. The network processing device includes a processor and a memory. The memory stores computer instructions, and the processor executes the computer instructions stored in the memory, to enable the network processing device to perform the method according to any embodiment of the third aspect.

According to a twelfth aspect, an embodiment may further provide a network device. The network device includes the network processing device in the eleventh aspect, a first transmission reception apparatus, and a second transmission reception apparatus.

According to a thirteenth aspect, an implementation may provide a non-transitory computer-readable storage medium. The non-transitory computer-readable storage medium is configured to store executable program code. When the program code is executed, the method according to any implementation of the first aspect, the method according to any implementation of the second aspect, the method according to any implementation of the third aspect, or the method according to any implementation of the fourth aspect is implemented.

DETAILED DESCRIPTION OF THE EMBODIMENTS

The following describes the embodiments with reference to the accompanying drawings.

Figure 1A:
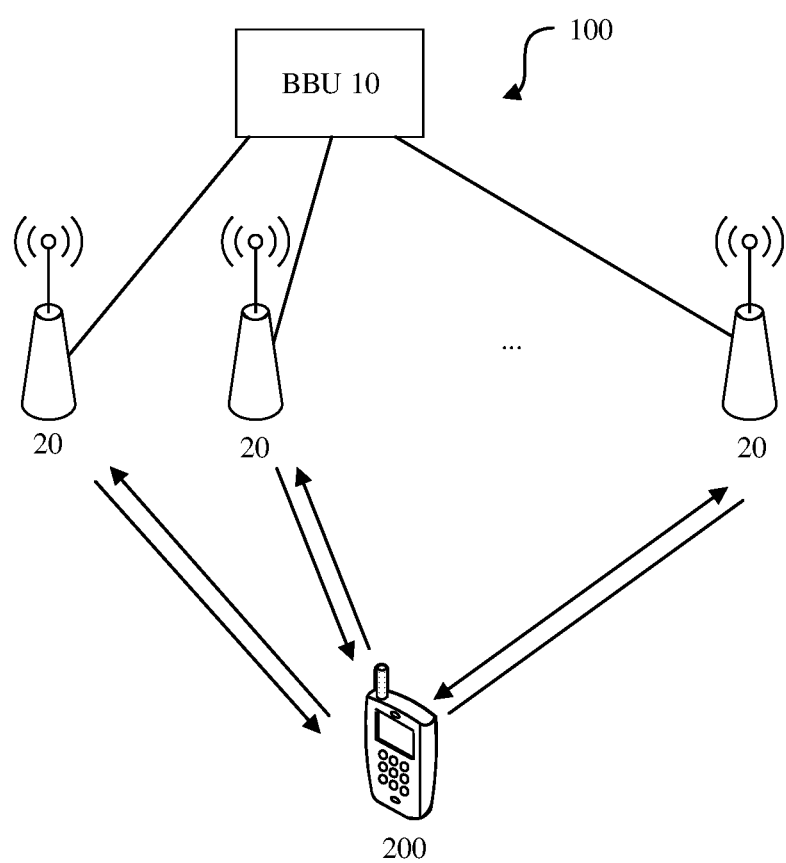
FIG. 1A is a schematic diagram of a network architecture of a communication system according to an embodiment.

FIG. 1A is a diagram of a network architecture of a communication system. The communication system includes an SFN cell 100 and a terminal device 200 accessing the SFN cell 100. The SFN cell 100 includes a baseband unit (BBU) 10 and a plurality of transmission reception apparatuses 20 connected to the BBU 10. It may be understood that the SFN cell may alternatively include two transmission reception apparatuses.

The transmission reception apparatus in the SFN cell is one or more of a remote radio unit (RRU), a remote radio head (RRH), or a TRP.

A BBU and a plurality of transmission reception apparatuses in one SFN cell may be deployed on a same network device. A BBU and a plurality of transmission reception apparatuses in one SFN cell may be deployed on different network devices. The BBU may be a network processing device.

Figure 1B:
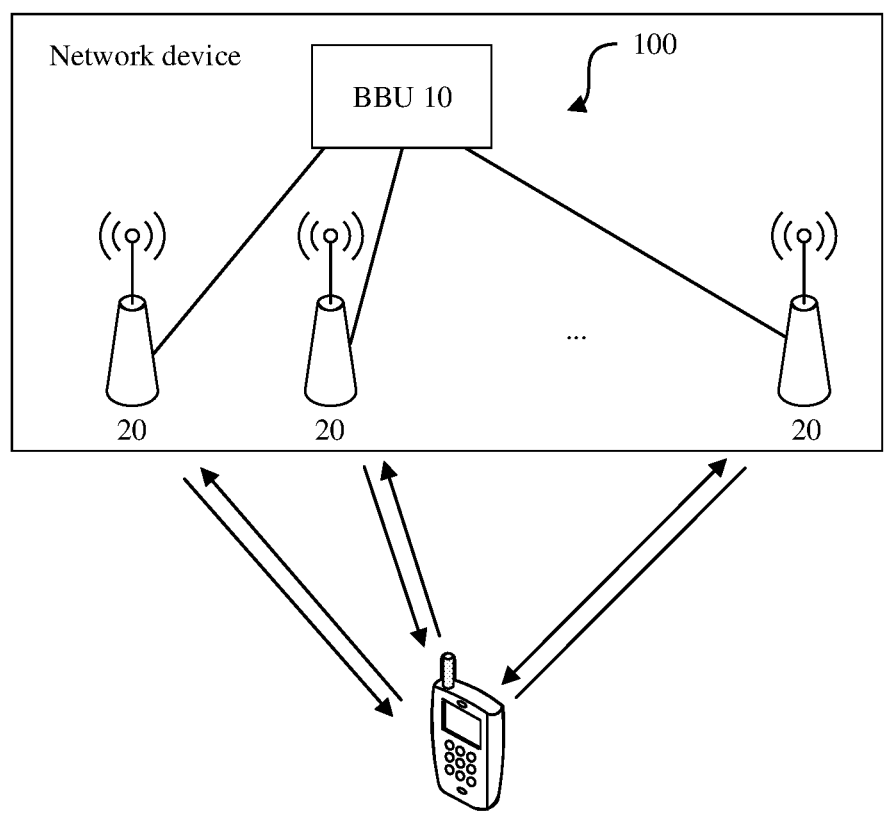
FIG. 1B is another diagram of a network architecture of a communication system according to an embodiment.
Figure 1C:
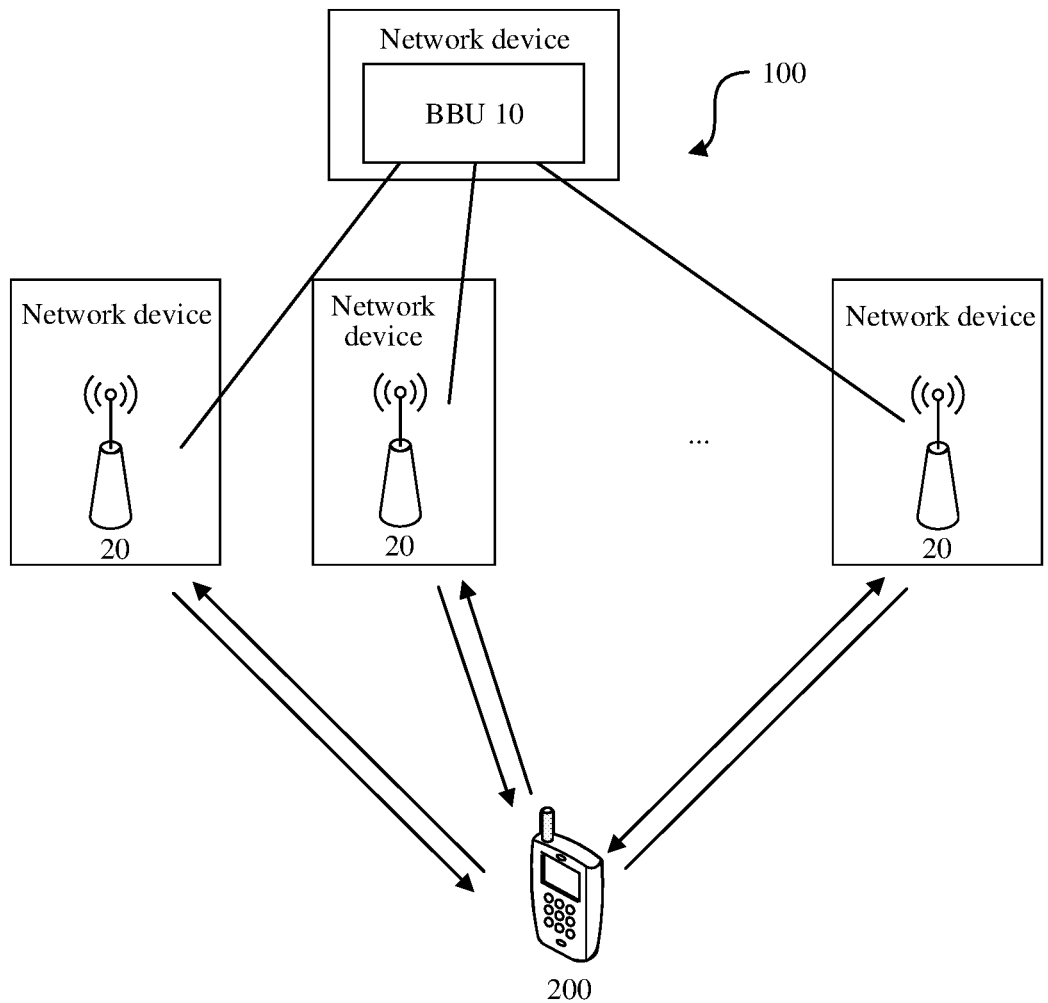
FIG. 1C is still another diagram of a network architecture of a communication system according to an embodiment.

FIG. 1B is another diagram of a network architecture of a communication system according to an embodiment. In FIG. 1B, a BBU and a plurality of transmission reception apparatuses 20 in one SFN cell are deployed on a same network device. FIG. 1C is still another diagram of a network architecture of a communication system according to an embodiment. In FIG. 1C, a BBU and a plurality of transmission reception apparatuses 20 in one SFN cell are deployed on different network devices. The transmission reception apparatus may be an RRU, an RRH, or a TRP of a deployed network device, or may be an independent network device having a processing capability. Hardware deployment of the SFN cell is not limited in the embodiments.

A network device in the embodiments is a device that is in an access network and that communicates with wireless user equipment over an air interface through one or more cells. For example, the network device may be an evolved NodeB (eNB) in a long term evolution (LTE) system or long term evolution-advanced (LTE-A), or may include a new radio network device (gNB) in a 5th generation mobile communication technology (5G) NR system.

A terminal device is a user-side device that is used by a user to receive a signal. For example, the terminal device may be, but is not limited to, a terminal device such as a mobile phone, a notebook computer, a tablet computer, or a large-screen television.

Figure 2A:
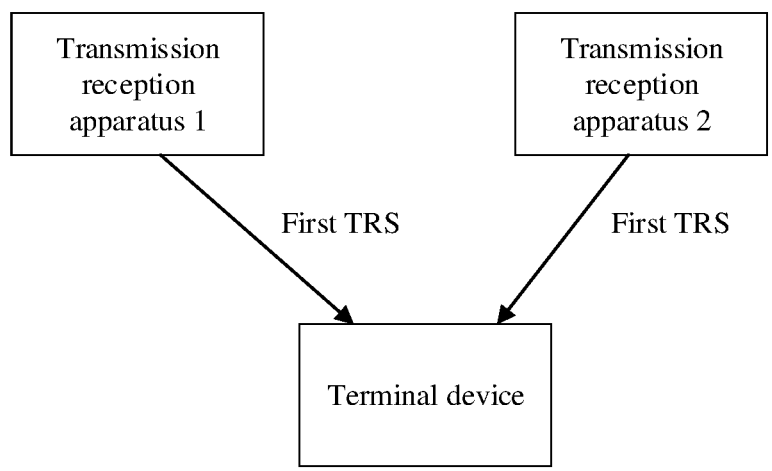
FIG. 2A is a schematic diagram of a scenario of a carrier frequency tracking method in a conventional technology.

FIG. 2A is a schematic diagram of a scenario of a carrier frequency tracking method in a conventional technology. In the conventional technology, after a terminal device accesses an SFN cell, a plurality of transmission reception apparatuses sends a same TRS to the terminal device on a same time-frequency resource. As shown in FIG. 2A, a transmission reception apparatus 1 and a transmission reception apparatus 2 send a same first TRS to the terminal device on a same time-frequency resource. Then, the terminal device determines, based on the first TRS, a first carrier frequency on which carrier frequency tracking is to be performed, and adjusts automatic frequency control (AFC) to the first carrier frequency, so that the terminal device receives downlink data on the first carrier frequency. For example, the terminal device receives a demodulation reference signal (DM-RS) and a physical downlink shared channel (PDSCH) on the first carrier frequency, and the terminal device may demodulate the PDSCH based on the DM-RS received on the first carrier frequency.

Usually, there is a frequency offset between the terminal device and the transmission reception apparatus. The frequency offset may include a carrier frequency offset (CFO) caused by an offset between carrier frequencies of local oscillators at transmit and receive ends, and a Doppler shift caused by relative motion of the transmit and receive ends. In this case, frequency offsets between different transmission reception apparatuses and the terminal device are different. In the conventional technology, a plurality of transmission reception apparatuses in a same SFN cell send a same TRS to the terminal on a same time-frequency resource. Therefore, the terminal device can receive the TRS only on a time-frequency resource corresponding to the TRS, and determine, based on a carrier frequency of the TRS, a carrier frequency on which the terminal device is to perform carrier frequency tracking. Consequently, the terminal device cannot obtain a most appropriate carrier frequency on which the carrier frequency tracking is to be performed, and data receiving, sending, and demodulation are affected, resulting in poor data transmission performance.

Figure 2B:
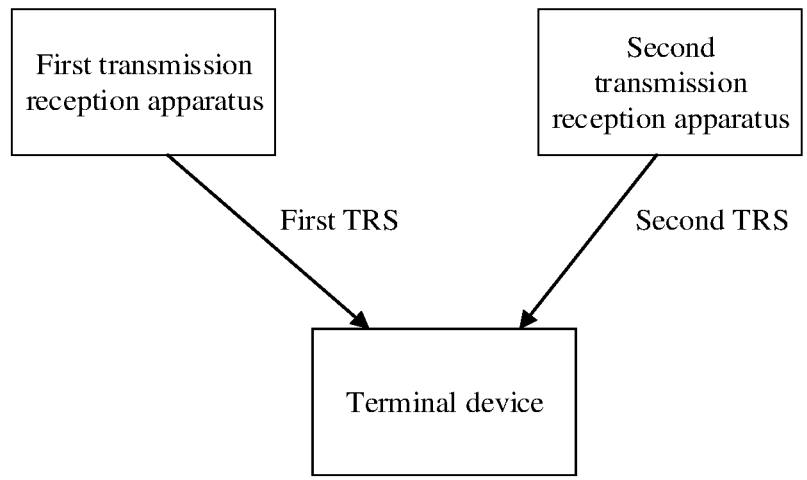
FIG. 2B is a schematic diagram of a scenario of a carrier frequency tracking method according to an embodiment.

FIG. 2B is a schematic diagram of a scenario of a carrier frequency tracking method according to an embodiment. In the scenario shown in FIG. 2B, a first transmission reception apparatus sends a first TRS to a terminal device, and a second transmission reception apparatus sends a second TRS to the terminal device. The first TRS and the second TRS occupy different time-frequency resources. In this way, the terminal device can receive the first TRS on a time-frequency resource used by the first transmission reception apparatus to send the TRS, and receive the second TRS on a time-frequency resource used by the second transmission reception apparatus to send the TRS. Therefore, one or more appropriate TRSs for carrier frequency tracking can be selected from the first TRS and the second TRS, to help improve data transmission performance of the terminal device. Data transmission includes data receiving or data sending. TRSs occupying different time-frequency resources may be considered as different TRSs.

It should be noted that only two transmission reception apparatuses are shown in an SFN cell in FIG. 2B. The carrier frequency tracking method in this embodiment is not limited to being used in the SFN cell including only two transmission reception apparatus. The carrier frequency tracking method in this embodiment may also be used in an SFN cell (for example, the SFN cell included in the communication system shown in FIG. 1A) including a plurality of (more than two) transmission reception apparatuses. When the SFN cell accessed by the terminal device includes the plurality of (more than two) transmission reception apparatuses, the first transmission reception apparatus and the second transmission reception apparatus may be any two transmission reception apparatuses in the SFN cell. When the SFN cell accessed by the terminal device includes the plurality of (more than two) transmission reception apparatuses, the plurality of transmission reception apparatuses sends a plurality of TRSs to the terminal device, each transmission reception apparatus is configured to send one TRS to the terminal device, and each of the plurality of TRSs occupies a different time-frequency resource. In this way, in this embodiment, the terminal device can receive, on the different time-frequency resources, the plurality of TRSs sent by the plurality of transmission reception apparatuses. Therefore, one or more appropriate TRSs for carrier frequency tracking can be selected from the plurality of TRSs.

Figure 3:
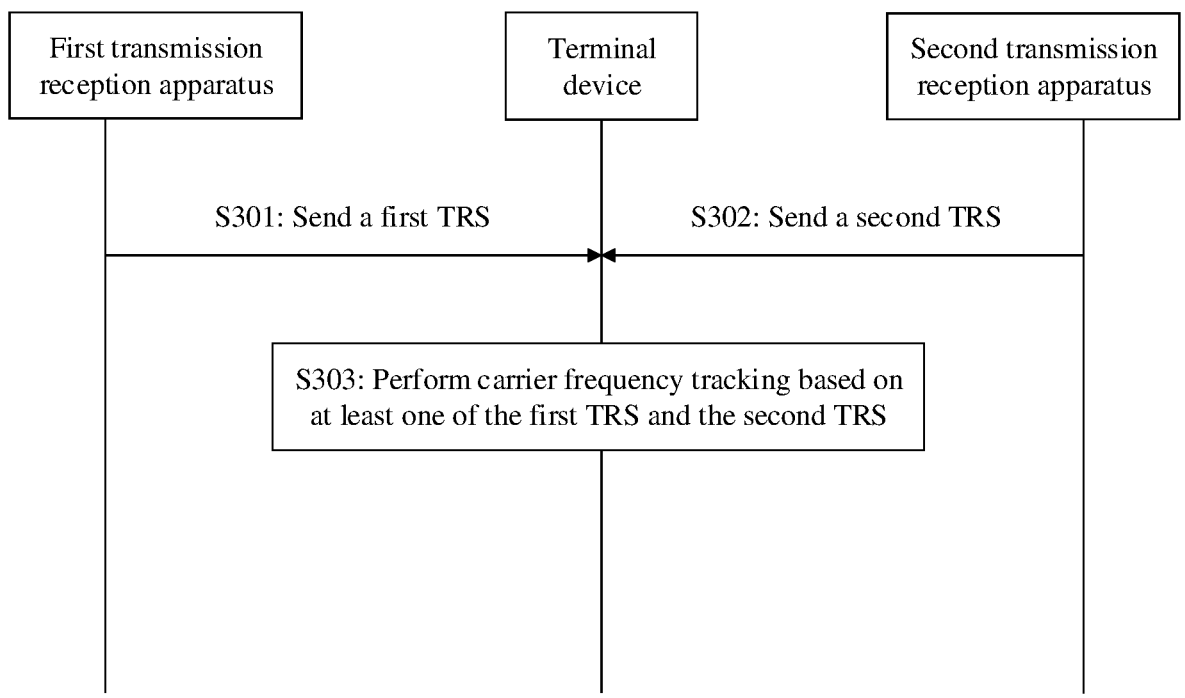
FIG. 3 is a schematic flowchart of a carrier frequency tracking method according to an implementation.

FIG. 3 is a schematic flowchart of a carrier frequency tracking method according to an implementation. The carrier frequency tracking method according to this implementation may include the following steps.

S301: A first transmission reception apparatus sends a first TRS to a terminal device.

A network processing device may send the first TRS to the terminal device through the first transmission reception apparatus.

S302: A second transmission reception apparatus sends the first TRS to the terminal device.

The network processing device may send the first TRS to the terminal device through the second transmission reception apparatus.

The first TRS and the second TRS occupy different time-frequency resources.

The terminal device receives the first TRS on a time-frequency resource corresponding to the first TRS and receives the second TRS on a time-frequency resource corresponding to the second TRS.

Before step S301 and step S302, the first transmission reception apparatus and the second transmission reception apparatus may send radio resource control (Radio Resource Control, RRC) signaling to the terminal device, to indicate a time-frequency resource occupied by a TRS sent by each transmission reception apparatus.

The first TRS and the second TRS may occupy different time domain resources, the first TRS and the second TRS may occupy different frequency domain resources, or the first TRS and the second TRS may occupy different time domain resources and different frequency domain resources.

S303: The terminal device performs carrier frequency tracking based on at least one of the first TRS and the second TRS.

Performing receiving and sending by the transmission reception apparatus may be understood as performing receiving and sending by the network processing device through the transmission reception apparatus.

It may be understood that the carrier frequency tracking method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

The plurality of (more than two) transmission reception apparatuses send TRSs to the terminal, each transmission reception apparatus is configured to send one TRS to the terminal device, and time-frequency resources occupied by the TRSs sent by the transmission reception apparatuses are different. The terminal device may receive, on the different time-frequency resources, the TRSs sent by all of the plurality of transmission reception apparatuses, to obtain a plurality of received TRSs. Then, the terminal device performs carrier frequency tracking based on at least one of the plurality of received TRSs.

In this embodiment, the first transmission reception apparatus sends the first TRS to the terminal device, the second transmission reception apparatus sends the first TRS to the terminal device, and the terminal device performs carrier frequency tracking based on at least one of the first TRS and the second TRS. In this way, the terminal device can obtain a plurality of received TRSs on different time-frequency resources. In this way, the terminal device can obtain, based on the plurality of received TRSs, one appropriate carrier frequency on which the carrier frequency tracking is to be performed, to improve data transmission performance of the terminal device, and further improve data demodulation performance of the terminal device.

Figure 4A:
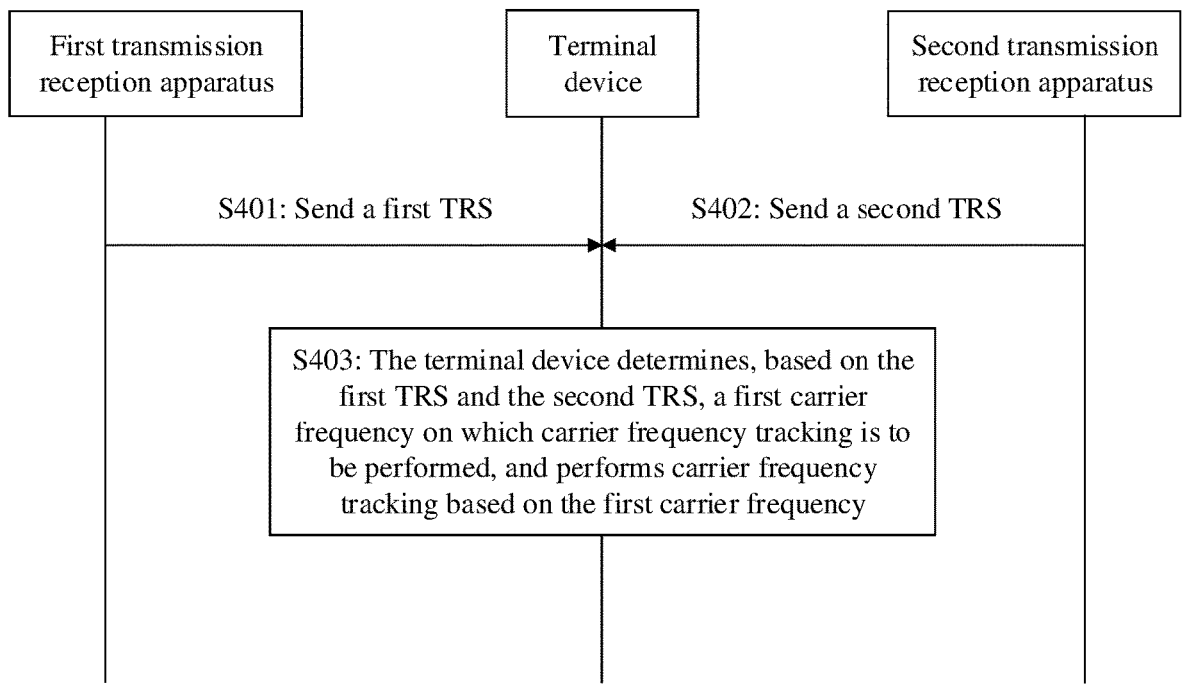
FIG. 4A is another schematic flowchart of a carrier frequency tracking method according to an embodiment.

FIG. 4A is another schematic flowchart of a carrier frequency tracking method according to an embodiment. In some embodiments, the carrier frequency tracking method may include the following steps.

S401: A first transmission reception apparatus sends a first TRS to a terminal device.

S402: A second transmission reception apparatus sends the first TRS to the terminal device.

Accordingly, the terminal device receives the first TRS from the first transmission reception apparatus and receives the second TRS from the second transmission reception apparatus. The first TRS and the second TRS occupy different time-frequency resources.

For explanations and descriptions of step S401 and step S402, refer to explanations and descriptions of step S301 and step S302 in the foregoing embodiment. To avoid redundancy, details are not described herein again.

S403: The terminal device determines, based on the first TRS and the second TRS, a first carrier frequency on which carrier frequency tracking is to be performed, and performs carrier frequency tracking based on the first carrier frequency.

In this way, the terminal device can obtain one appropriate first carrier frequency based on the first TRS and the second TRS. In this way, the terminal device can more accurately perform carrier frequency tracking, so that the terminal device can better receive and demodulate downlink data.

Further, the carrier frequency tracking method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the plurality of transmission reception apparatuses sends TRSs to the terminal device, each transmission reception apparatus is configured to send one TRS to the terminal device, and time-frequency resources occupied by the TRSs sent by the transmission reception apparatuses are different. The terminal device may receive, on the different time-frequency resources, the TRSs sent by all of the plurality of transmission reception apparatuses, to obtain a plurality of received TRSs. Then, the terminal device determines, based on the plurality of received TRSs, a first carrier frequency on which carrier frequency tracking is to be performed, and performs carrier frequency tracking based on the first carrier frequency.

In some embodiments, the carrier frequency tracking method further includes the following step: The terminal device sends carrier frequency tracking information, where the carrier frequency tracking information is for feeding back that the terminal device performs carrier frequency tracking based on the first carrier frequency. In this way, the transmission reception apparatus obtains the carrier frequency tracking information, and can receive, based on the carrier frequency tracking information, uplink data sent by the terminal device. In addition, the transmission reception apparatus receives the carrier frequency tracking information and estimates a frequency offset between the transmission reception apparatus and the terminal device based on the first carrier frequency indicated by the carrier frequency tracking information and a carrier frequency of an uplink reference signal that is sent by the terminal and that is received by each transmission reception apparatus.

Figure 4B:
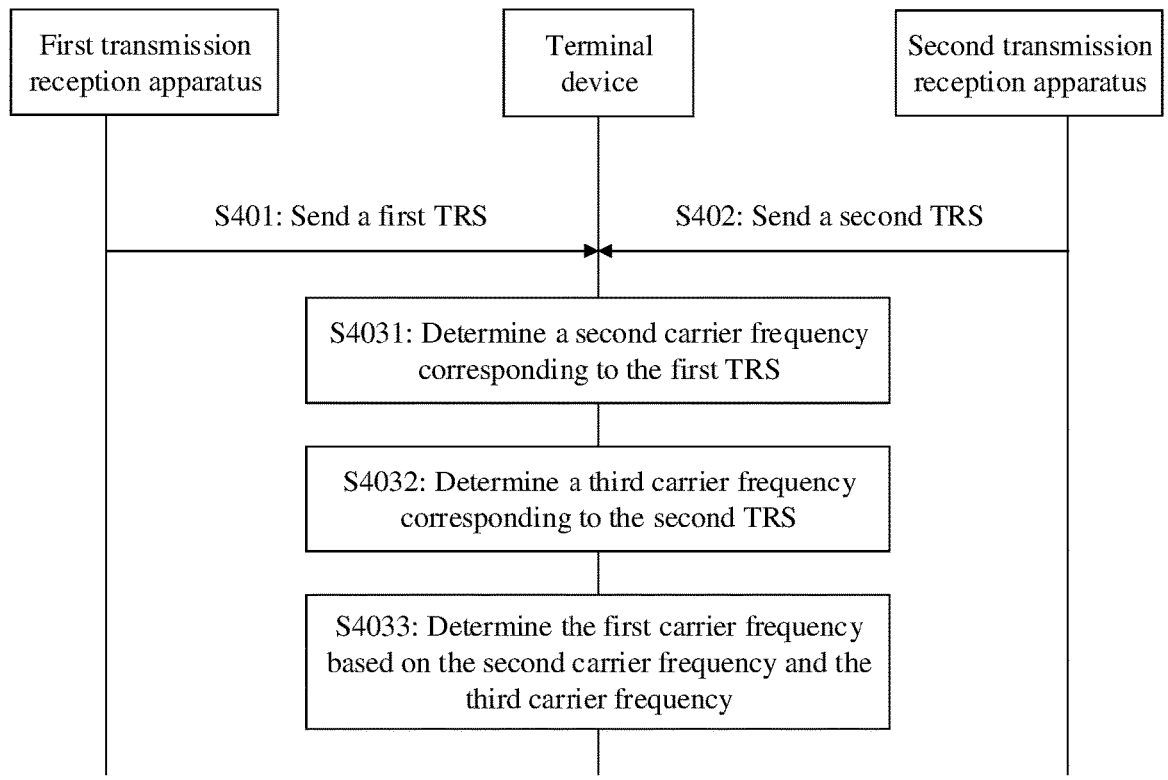
FIG. 4B is another schematic flowchart of a carrier frequency tracking method according to an embodiment.

FIG. 4B is another schematic flowchart of a carrier frequency tracking method according to an embodiment. Based on the embodiment shown in FIG. 4A, in some embodiments, S403 may include the following steps:

S4031: The terminal device determines a second carrier frequency corresponding to the first TRS.

S4032: The terminal device determines a third carrier frequency corresponding to the second TRS.

S4033: The terminal device determines the first carrier frequency based on the second carrier frequency and the third carrier frequency.

The terminal device may use the second carrier frequency as the first carrier frequency, the terminal device may use the third carrier frequency as the first carrier frequency, or the terminal device may obtain the first carrier frequency through calculation based on the second carrier frequency and the third carrier frequency.

For example, the terminal device may use an arithmetic average value of the second carrier frequency and the third carrier frequency as the first carrier frequency, or the terminal device may use a weighted average value of the second carrier frequency and the third carrier frequency as the first carrier frequency.

In this way, the first carrier frequency is obtained based on the second carrier frequency corresponding to the first TRS and the third carrier frequency corresponding to the second TRS, so that the first carrier frequency on which the carrier frequency tracking is to be performed can be more appropriate. The terminal device performs carrier frequency tracking based on the first carrier frequency, adjusts AFC of the terminal device to the first carrier frequency, and receives, on the first carrier frequency, a DM-RS and a PDSCH that are sent by each transmission reception apparatus of an SFN cell. In this way, data reception and demodulation performance of the terminal device can be improved.

Optionally, the terminal device uses a weighted average value of carrier frequencies corresponding to all TRSs as the first carrier frequency, and a weighted value of a carrier frequency corresponding to a TRS sent by each transmission reception apparatus is determined by the terminal device based on receive power of a downlink reference signal received by the terminal device from the transmission reception apparatus or a signal to interference plus noise ratio (SINR) of the downlink reference signal received by the terminal device from the transmission reception apparatus. The terminal device may distinguish between downlink reference signals sent by all transmission reception apparatuses. In other words, the terminal device can identify a transmission reception apparatus that sends the downlink signal. For example, the downlink reference signal may be, but is not limited to, a TRS. In an example, the receive power is positively correlated with the weighted value. In this way, a weighted value of a carrier frequency corresponding to a TRS with higher receive power can be larger, so that the first carrier frequency can be more likely to be similar to a carrier frequency corresponding to a TRS with higher signal strength. In this case, the terminal device performs carrier frequency tracking based on the first carrier frequency, to improve data transmission performance of the terminal device.

When an absolute value of a difference between the second carrier frequency and the third carrier frequency is less than a frequency offset threshold, the terminal device determines the first carrier frequency based on the second carrier frequency and the third carrier frequency. The frequency offset threshold is a real number and is for measuring a difference between two selected carrier frequencies. The frequency offset threshold is stored in the terminal device, and frequency offset thresholds of different terminal devices may be the same or may be different. It may be understood that, when the absolute value of the difference between the second carrier frequency and the third carrier frequency is less than the frequency offset threshold, a difference between a frequency offset between the terminal device and the first transmission reception apparatus and a frequency offset between the terminal device and the second transmission reception apparatus is not large. In this case, the terminal device may determine, based on the second carrier frequency corresponding to the first TRS sent by the first transmission reception apparatus and the third carrier frequency corresponding to the second TRS sent by the second transmission reception apparatus, the first carrier frequency on which the carrier frequency tracking is to be performed. In this way, the first carrier frequency is determined by comprehensively considering the second carrier frequency corresponding to the first TRS sent by the first transmission reception apparatus and the third carrier frequency corresponding to the second TRS sent by the second transmission reception apparatus, so that the terminal device can track, on the first carrier frequency, a carrier frequency sent by each transmission reception apparatus, to improve downlink data receiving performance.

When an absolute value of a difference between the second carrier frequency and the third carrier frequency is greater than a frequency offset threshold, the terminal device uses either of the first carrier frequency and the second carrier frequency as the first carrier frequency. For example, the terminal device may obtain a first signal to interference plus noise ratio corresponding to the first TRS and a second signal to interference plus noise ratio corresponding to the second TRS, and determine, based on the first signal to interference plus noise ratio and the second signal to interference plus noise ratio, to use the second carrier frequency or the third carrier frequency as the first carrier frequency. Optionally, the terminal device uses a carrier frequency corresponding to a TRS with a largest signal to interference plus noise ratio as the first carrier frequency and performs carrier frequency tracking based on the first carrier frequency. For another example, the terminal device may obtain first receive power corresponding to the first TRS and second receive power corresponding to the second TRS, and determine, based on the first receive power and the second receive power, to use the second carrier frequency or the third carrier frequency as the first carrier frequency. Optionally, the terminal device uses a carrier frequency corresponding to a TRS with highest receive power as the first carrier frequency and performs carrier frequency tracking based on the first carrier frequency.

When an absolute value of a difference between the second carrier frequency and the third carrier frequency is equal to a frequency offset threshold, the terminal device may use a processing manner used when the absolute value of the difference between the second carrier frequency and the third carrier frequency is greater than the frequency offset threshold, that is, may determine the first carrier frequency based on the second carrier frequency and the third carrier frequency; or the terminal device uses a processing manner used when the absolute value of the difference between the second carrier frequency and the third carrier frequency is less than the frequency offset threshold, that is, uses either of the first carrier frequency and the second carrier frequency as the first carrier frequency.

It should be noted that the carrier frequency tracking method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different.

The terminal device may receive, on the different time-frequency resources, the TRSs sent by all of the plurality of transmission reception apparatuses, to obtain a plurality of TRSs. Then, the terminal device obtains a carrier frequency corresponding to each of the plurality of TRSs, and then determines, based on the carrier frequency corresponding to each of the plurality of TRSs, a first carrier frequency on which carrier frequency tracking is to be performed.

Optionally, the terminal device may obtain the carrier frequency corresponding to each of the plurality of TRSs, and then calculate an absolute value of a difference between carrier frequencies corresponding to every two different TRSs to obtain a plurality of frequency offset residuals, where each frequency offset residual is the absolute value of the difference between the carrier frequencies corresponding to the two different TRSs. When an average value of the plurality of frequency offset residuals is less than a frequency offset threshold, the terminal device determines, based on the carrier frequency corresponding to each of the plurality of TRSs, the first carrier frequency on which the carrier frequency tracking is to be performed. For example, the terminal device may use a weighted average value of the carrier frequencies corresponding to all of the plurality of TRSs as the first carrier frequency.

When an average value of the plurality of frequency offset residuals is greater than a frequency offset threshold, the terminal device uses a carrier frequency corresponding to one of the plurality of TRSs as the first carrier frequency. For example, the terminal device may obtain a signal to interference plus noise ratio corresponding to each TRS and use a carrier frequency corresponding to one of the TRSs as the first carrier frequency based on the signal to interference plus noise ratio corresponding to each TRS. Optionally, the terminal device uses a carrier frequency corresponding to a TRS with a largest signal to interference plus noise ratio as the first carrier frequency. For another example, the terminal device may obtain receive power corresponding to each TRS and use a carrier frequency corresponding to one of the TRSs as the first carrier frequency based on the receive power corresponding to each TRS. Optionally, the terminal device uses a carrier frequency corresponding to a TRS with highest receive power as the first carrier frequency.

When an average value of the plurality of frequency offset residuals is equal to a frequency offset threshold, the terminal device may use a processing manner used when the average value of the plurality of frequency offset residuals is greater than the frequency offset threshold, that is, may use a carrier frequency corresponding to one of the plurality of TRSs as the first carrier frequency; or the terminal device may use a processing manner used when the average value of the plurality of frequency offset residuals is less than the frequency offset threshold, that is, may determine, based on the carrier frequency corresponding to each of the plurality of TRSs, the first carrier frequency on which the carrier frequency tracking is to be performed.

Figure 4C:
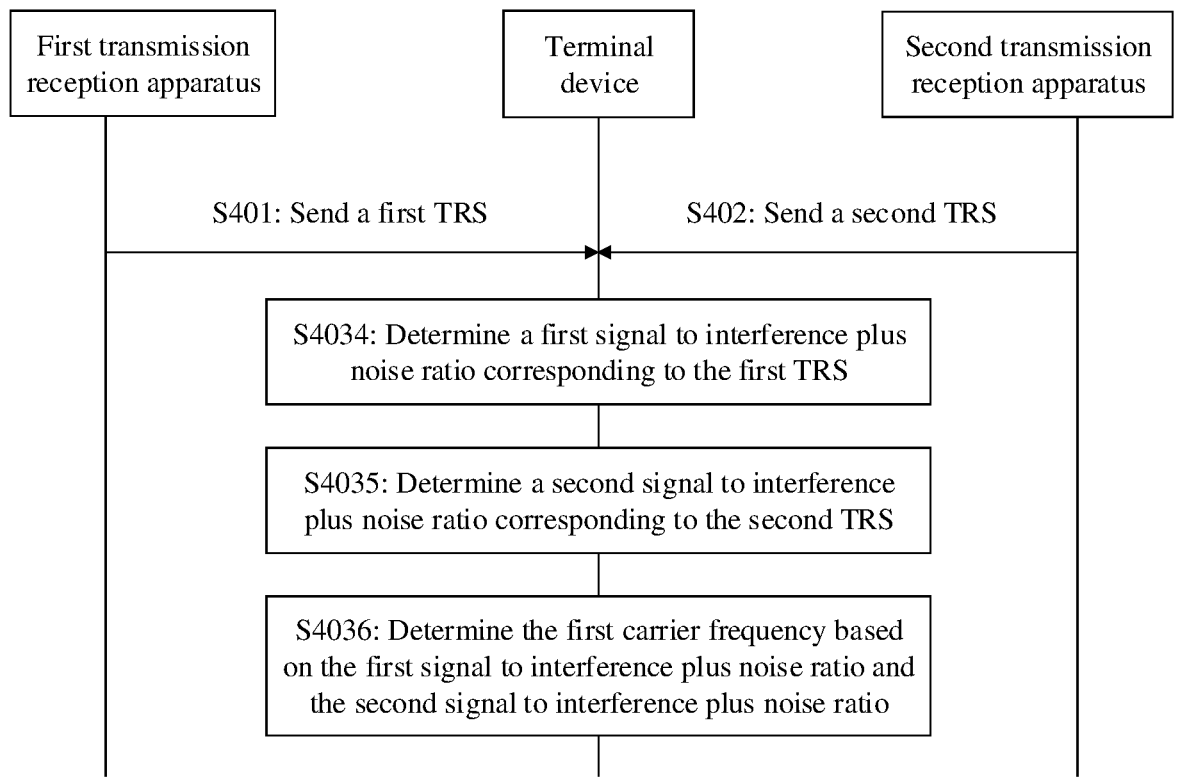
FIG. 4C is another schematic flowchart of a carrier frequency tracking method according to an embodiment.

FIG. 4C is another schematic flowchart of a carrier frequency tracking method according to an embodiment. Based on the embodiment shown in FIG. 4A, in some embodiments, S403 may include the following steps:

S4034: The terminal device determines a first signal to interference plus noise ratio corresponding to the first TRS.

S4035: The terminal device determines a second signal to interference plus noise ratio corresponding to the second TRS.

S4036: The terminal device determines the first carrier frequency based on the first signal to interference plus noise ratio and the second signal to interference plus noise ratio, where the first carrier frequency is a second carrier frequency corresponding to the first TRS or a third carrier frequency corresponding to the second TRS.

A signal to interference plus noise ratio reflects quality of a signal sent by a transmission reception apparatus corresponding to each TRS to the terminal device. The terminal device selects, from the first TRS and the second TRS based on the first signal to interference plus noise ratio of the first TRS and the second signal to interference plus noise ratio of the second TRS, one first carrier frequency as the first carrier frequency on which the carrier frequency tracking is to be performed, so that the terminal device can select a carrier frequency, with appropriate signal quality, on which the tracking is to be performed.

Optionally, the terminal device uses a carrier frequency corresponding to a TRS with a largest signal to interference plus noise ratio as the first carrier frequency. For example, if the first signal to interference plus noise ratio is the largest, the second carrier frequency is used as the first carrier frequency. Alternatively, if the second signal to interference plus noise ratio is the largest, the third carrier frequency is used as the first carrier frequency. The signal to interference plus noise ratio reflects the quality of the signal sent by the transmission reception apparatus corresponding to each TRS to the terminal device. Therefore, the terminal device selects, based on the first signal to interference plus noise ratio and the second signal to interference plus noise ratio, the carrier frequency corresponding to the TRS with the largest signal to interference plus noise ratio as the first carrier frequency. In this way, the terminal device can track a carrier frequency with best signal quality, to improve downlink data receiving and demodulation performance of the terminal device.

In an optional embodiment, S4036 includes: The terminal device determines the second carrier frequency corresponding to the first TRS. The terminal device determines the third carrier frequency corresponding to the second TRS. When an absolute value of a difference between the second carrier frequency and the third carrier frequency is greater than a frequency offset threshold, the terminal device determines the first carrier frequency based on the first signal to interference plus noise ratio and the second signal to interference plus noise ratio. The first carrier frequency is the second carrier frequency corresponding to the first TRS or the third carrier frequency corresponding to the second TRS.

It may be understood that when the absolute value of the difference between the second carrier frequency and the third carrier frequency is greater than the frequency offset threshold, a difference between a frequency offset between the terminal device and the first transmission reception apparatus and a frequency offset between the terminal device and the second transmission reception apparatus is large. The terminal device selects one carrier frequency to track, so that it can be ensured that a carrier frequency sent by one transmission reception apparatus is better tracked.

Optionally, when the absolute value of the difference between the second carrier frequency and the third carrier frequency is greater than the frequency offset threshold, the terminal device may select the carrier frequency corresponding to the TRS with the largest signal to interference plus noise ratio as the first carrier frequency on which the carrier frequency tracking is to be performed. In this way, the terminal device can track downlink data sent by a transmission reception apparatus with best signal quality, to improve the downlink data receiving and demodulation performance of the terminal device.

Further, the carrier frequency tracking method further includes: The terminal device sends feedback information, where the feedback information is for indicating to silence a transmission reception apparatus other than a transmission reception apparatus corresponding to the first carrier frequency.

The terminal device may send the feedback information in a broadcast manner. After transmission reception apparatuses in an SFN cell receive the feedback information, the transmission reception apparatus other than the transmission reception apparatus corresponding to the first carrier frequency is silenced. Alternatively, after receiving the feedback information sent by the terminal, at least one of a plurality of transmission reception apparatuses sends the feedback information to a BBU. The BBU indicates, based on the feedback information, the transmission reception apparatus other than the transmission reception apparatus corresponding to the first carrier frequency to switch to a silent state.

After obtaining the feedback information, the BBU of the SFN cell may switch a carrier frequency tracking solution, for example, switch to a carrier frequency tracking solution in dynamic point selection (DPS). The BBU sends a switching indication to the terminal device through the first transmission reception apparatus or the second transmission reception apparatus, to indicate the terminal device to perform carrier frequency tracking based on the carrier frequency tracking solution in the DPS.

Optionally, when an absolute value of a difference between the second carrier frequency and the third carrier frequency is less than a frequency offset threshold, the terminal device obtains, through calculation based on the second carrier frequency and the third carrier frequency, the first carrier frequency on which the carrier frequency tracking is to be performed. It may be understood that, when the absolute value of the difference between the second carrier frequency and the third carrier frequency is less than the frequency offset threshold, a difference between a frequency offset between the terminal device and the first transmission reception apparatus and a frequency offset between the terminal device and the second transmission reception apparatus is not large. In this case, the terminal device may determine, based on the second carrier frequency corresponding to the first TRS sent by the first transmission reception apparatus and the third carrier frequency corresponding to the second TRS sent by the second transmission reception apparatus, the first carrier frequency on which the carrier frequency tracking is to be performed. In this way, the first carrier frequency is determined by comprehensively considering the second carrier frequency corresponding to the first TRS sent by the first transmission reception apparatus and the third carrier frequency corresponding to the second TRS sent by the second transmission reception apparatus, so that the terminal device can track, on the first carrier frequency, a carrier frequency sent by each transmission reception apparatus, to improve the downlink data receiving performance.

When an absolute value of a difference between the second carrier frequency and the third carrier frequency is equal to a frequency offset threshold, the terminal device may use a processing manner used when the absolute value of the difference between the second carrier frequency and the third carrier frequency is greater than the frequency offset threshold, that is, may select either of the second carrier frequency corresponding to the first TRS and the second carrier frequency corresponding to the second TRS as the first carrier frequency based on the first signal to interference plus noise ratio and the second signal to interference plus noise ratio; or the terminal device may use a processing manner used when the absolute value of the difference between the second carrier frequency and the third carrier frequency is less than the frequency offset threshold, that is, may obtain, through calculation based on the second carrier frequency and the third carrier frequency, the first carrier frequency on which the carrier frequency tracking is to be performed.

It should be noted that the carrier frequency tracking method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

For example, in the scenario in which the SFN cell includes the plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different.

The terminal device may receive, on the different time-frequency resources, the TRSs sent by all of the plurality of transmission reception apparatuses, to obtain a plurality of TRSs. Then, the terminal device selects, based on a signal to interference plus noise ratio of each of the plurality of TRSs, a carrier frequency corresponding to one of the plurality of TRSs as a first carrier frequency on which carrier frequency tracking is to be performed. For example, the terminal device may obtain the signal to interference plus noise ratio of each TRS, and use a carrier frequency corresponding to a TRS with a largest signal to interference plus noise ratio as the first carrier frequency. In this way, the terminal device can track downlink data sent by a transmission reception apparatus with best signal quality, to improve downlink data receiving and demodulation performance of the terminal device.

Optionally, the terminal device may obtain a carrier frequency corresponding to each of the plurality of TRSs, and then calculate an absolute value of a difference between carrier frequencies corresponding to every two different TRSs to obtain a plurality of frequency offset residuals, where each frequency offset residual is the absolute value of the difference between the carrier frequencies corresponding to the two different TRSs. When an average value of the plurality of frequency offset residuals is greater than a frequency offset threshold, the terminal device selects a carrier frequency of one of the plurality of TRSs as the first carrier frequency based on the signal to interference plus noise ratio of each TRS. Optionally, the terminal device uses a carrier frequency corresponding to a TRS with a largest signal to interference plus noise ratio as the first carrier frequency.

After determining the first carrier frequency, the terminal device sends feedback information, where the feedback information is for indicating to silence a transmission reception apparatus other than a transmission reception apparatus corresponding to the first carrier frequency.

After obtaining the feedback information, the BBU of the SFN cell may switch a carrier frequency tracking solution, for example, switch to a carrier frequency tracking solution in dynamic point selection (DPS). The BBU sends a switching indication to the terminal device through at least one of the plurality of transmission reception apparatuses, to indicate the terminal device to perform carrier frequency tracking based on the carrier frequency tracking solution in the DPS.

Optionally, when an average value of the plurality of frequency offset residuals is less than a frequency offset threshold, the terminal device obtains, through calculation based on the carrier frequency corresponding to each of the plurality of TRSs, the first carrier frequency on which the carrier frequency tracking is to be performed. It may be understood that when the average value of the plurality of frequency offset residuals is less than the frequency offset threshold, a difference between frequency offsets between the terminal device and the transmission reception apparatuses is not large. In this case, the terminal device may obtain, through calculation based on the carrier frequency corresponding to each of the plurality of TRSs, the first carrier frequency on which the carrier frequency tracking is to be performed. In this way, the first carrier frequency is determined by comprehensively considering the carrier frequency corresponding to the TRS sent by each transmission reception apparatus, so that the terminal device can track, on the first carrier frequency, the carrier frequency sent by each transmission reception apparatus, to improve the downlink data receiving performance.

When an average value of the plurality of frequency offset residuals is equal to a frequency offset threshold, the terminal device may use a processing manner used when the average value of the plurality of frequency offset residuals is greater than the frequency offset threshold, that is, may select a carrier frequency of one of the plurality of TRSs as the first carrier frequency based on the signal to interference plus noise ratio of each TRS; or the terminal device may use a processing manner used when the average value of the plurality of frequency offset residuals is less than the frequency offset threshold, that is, may obtain, through calculation based on the carrier frequency corresponding to each of the plurality of TRSs, the first carrier frequency on which the carrier frequency tracking is to be performed.

Figure 4D:
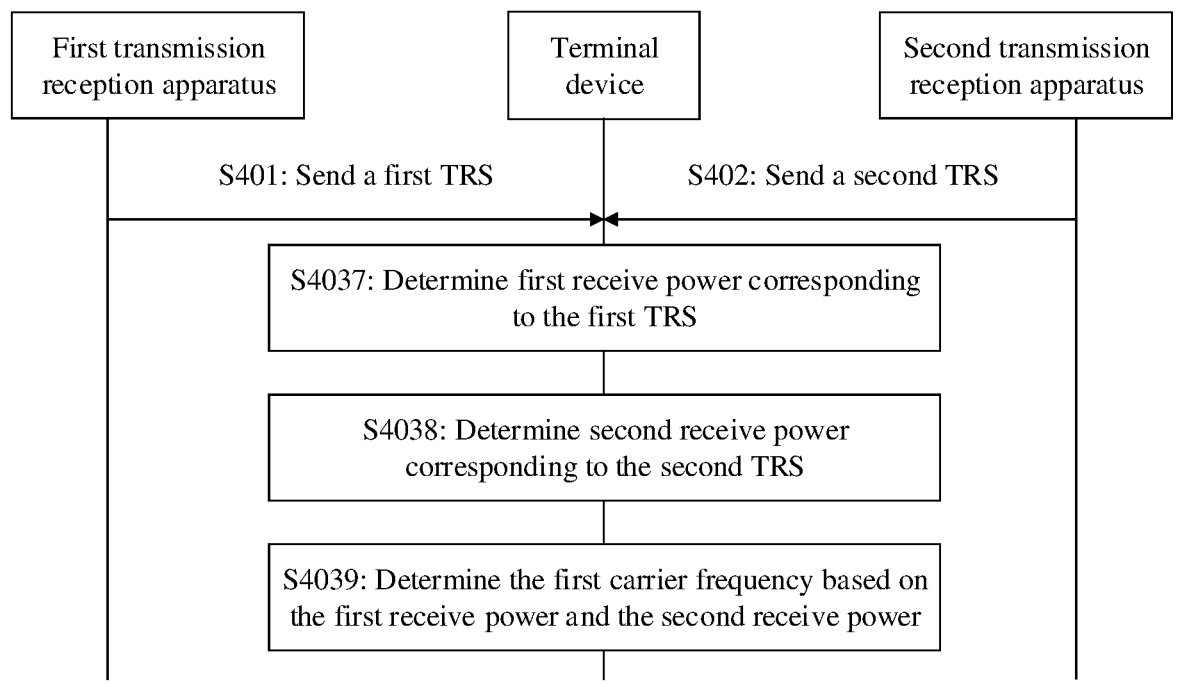
FIG. 4D is another schematic flowchart of a carrier frequency tracking method according to an embodiment.

FIG. 4D is another schematic flowchart of a carrier frequency tracking method according to an embodiment. Based on the embodiment shown in FIG. 4A, in some embodiments, S403 may include the following steps:

S4037: The terminal device determines first receive power corresponding to the first TRS.

S4038: The terminal device determines second receive power corresponding to the second TRS.

S4039: The terminal device determines the first carrier frequency based on the first receive power and the second receive power, where the first carrier frequency is a second carrier frequency corresponding to the first TRS or a third carrier frequency corresponding to the second TRS.

Receive power reflects strength of a signal sent by a transmission reception apparatus corresponding to each TRS to the terminal device. The terminal device selects, from the first TRS and the second TRS based on the first receive power of the first TRS and the second receive power of the second TRS, one first carrier frequency as the first carrier frequency on which the carrier frequency tracking is to be performed, so that the terminal device can select a carrier frequency, with appropriate signal strength, on which the tracking is to be performed.

In an optional embodiment, the terminal device uses a carrier frequency corresponding to a TRS with highest receive power as the first carrier frequency. For example, if the first receive power is the highest, the second carrier frequency is used as the first carrier frequency. Alternatively, if the second receive power is the highest, the third carrier frequency is used as the first carrier frequency. The receive power reflects quality of the signal sent by the transmission reception apparatus corresponding to each TRS to the terminal device. In this case, the terminal device selects, based on the first receive power and the second receive power, the carrier frequency corresponding to the TRS with the highest receive power as the first carrier frequency. In this way, the terminal device can track a carrier frequency with highest signal strength, to improve downlink data receiving and demodulation performance of the terminal device.

In an optional embodiment, S4039 includes: The terminal device determines the second carrier frequency corresponding to the first TRS. The terminal device determines the third carrier frequency corresponding to the second TRS. When an absolute value of a difference between the second carrier frequency and the third carrier frequency is greater than a frequency offset threshold, the terminal device determines the first carrier frequency based on the first receive power and the second receive power. The first carrier frequency is the second carrier frequency corresponding to the first TRS or the third carrier frequency corresponding to the second TRS.

It may be understood that when the absolute value of the difference between the second carrier frequency and the third carrier frequency is greater than the frequency offset threshold, a difference between a frequency offset between the terminal device and the first transmission reception apparatus and a frequency offset between the terminal device and the second transmission reception apparatus is large. The terminal device selects one carrier frequency to track, so that it can be ensured that a carrier frequency sent by one transmission reception apparatus is better tracked.

Optionally, when the absolute value of the difference between the second carrier frequency and the third carrier frequency is greater than the frequency offset threshold, the terminal device may select the carrier frequency corresponding to the TRS with the highest receive power as the first carrier frequency on which the carrier frequency tracking is to be performed. In this way, the terminal device can track downlink data sent by a transmission reception apparatus with highest signal strength, to improve the downlink data receiving and demodulation performance of the terminal device.

Further, the carrier frequency tracking method further includes: The terminal device sends feedback information, where the feedback information is for indicating to silence a transmission reception apparatus other than a transmission reception apparatus corresponding to the first carrier frequency.

The terminal device may send the feedback information in a broadcast manner. After transmission reception apparatuses in an SFN cell receive the feedback information, the transmission reception apparatus other than the transmission reception apparatus corresponding to the first carrier frequency is silenced. Alternatively, after receiving the feedback information sent by the terminal, at least one of a plurality of transmission reception apparatuses sends the feedback information to a BBU. The BBU indicates, based on the feedback information, the transmission reception apparatus other than the transmission reception apparatus corresponding to the first carrier frequency to switch to a silent state.

After obtaining the feedback information, the BBU of the SFN cell may switch a carrier frequency tracking solution, for example, switch to a carrier frequency tracking solution in dynamic point selection (DPS). The BBU sends a switching indication to the terminal device through the first transmission reception apparatus or the second transmission reception apparatus, to indicate the terminal device to perform carrier frequency tracking based on the carrier frequency tracking solution in the DPS.

Optionally, when an absolute value of a difference between the second carrier frequency and the third carrier frequency is less than a frequency offset threshold, the terminal device obtains, through calculation based on the second carrier frequency and the third carrier frequency, the first carrier frequency on which the carrier frequency tracking is to be performed. It may be understood that, when the absolute value of the difference between the second carrier frequency and the third carrier frequency is less than the frequency offset threshold, a difference between a frequency offset between the terminal device and the first transmission reception apparatus and a frequency offset between the terminal device and the second transmission reception apparatus is not large. In this case, the terminal device may determine, based on the second carrier frequency corresponding to the first TRS sent by the first transmission reception apparatus and the third carrier frequency corresponding to the second TRS sent by the second transmission reception apparatus, the first carrier frequency on which the carrier frequency tracking is to be performed. In this way, the first carrier frequency is determined by comprehensively considering the second carrier frequency corresponding to the first TRS sent by the first transmission reception apparatus and the third carrier frequency corresponding to the second TRS sent by the second transmission reception apparatus, so that the terminal device can track, on the first carrier frequency, a carrier frequency sent by each transmission reception apparatus, to improve the downlink data receiving performance.

When an absolute value of a difference between the second carrier frequency and the third carrier frequency is equal to a frequency offset threshold, the terminal device may use a processing manner used when the absolute value of the difference between the second carrier frequency and the third carrier frequency is greater than the frequency offset threshold, that is, may select either of the second carrier frequency corresponding to the first TRS and the second carrier frequency corresponding to the second TRS as the first carrier frequency based on the first receive power and the second receive power; or the terminal device may use a processing manner used when the absolute value of the difference between the second carrier frequency and the third carrier frequency is less than the frequency offset threshold, that is, may obtain, through calculation based on the second carrier frequency and the third carrier frequency, the first carrier frequency on which the carrier frequency tracking is to be performed.

It should be noted that the carrier frequency tracking method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

For example, in the scenario in which the SFN cell includes the plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different.

The terminal device may receive, on the different time-frequency resources, the TRSs sent by all of the plurality of transmission reception apparatuses, to obtain a plurality of TRSs. Then, the terminal device selects, based on receive power of each of the plurality of TRSs, a carrier frequency corresponding to one of the plurality of TRSs as a first carrier frequency on which carrier frequency tracking is to be performed. For example, the terminal device may obtain the receive power of each TRS and use a carrier frequency corresponding to a TRS with highest receive power as the first carrier frequency. In this way, the terminal device can track downlink data sent by a transmission reception apparatus with highest signal strength, to improve downlink data receiving and demodulation performance of the terminal device.

Optionally, the terminal device may obtain a carrier frequency corresponding to each of the plurality of TRSs, and then calculate an absolute value of a difference between carrier frequencies corresponding to every two different TRSs to obtain a plurality of frequency offset residuals, where each frequency offset residual is the absolute value of the difference between the carrier frequencies corresponding to the two different TRSs. When an average value of the plurality of frequency offset residuals is greater than a frequency offset threshold, the terminal device selects a carrier frequency of one of the plurality of TRSs as the first carrier frequency based on the receive power of each TRS. Optionally, the terminal device uses a carrier frequency corresponding to a TRS with highest receive power as the first carrier frequency.

After determining the first carrier frequency, the terminal device sends feedback information, where the feedback information is for indicating to silence a transmission reception apparatus other than a transmission reception apparatus corresponding to the first carrier frequency.

After obtaining the feedback information, the BBU of the SFN cell may switch a carrier frequency tracking solution, for example, switch to a carrier frequency tracking solution in dynamic point selection (DPS). The BBU sends a switching indication to the terminal device through at least one of the plurality of transmission reception apparatuses, to indicate the terminal device to perform carrier frequency tracking based on the carrier frequency tracking solution in the DPS.

Optionally, when an average value of the plurality of frequency offset residuals is less than a frequency offset threshold, the terminal device obtains, through calculation based on the carrier frequency corresponding to each of the plurality of TRSs, the first carrier frequency on which the carrier frequency tracking is to be performed. It may be understood that when the average value of the plurality of frequency offset residuals is less than the frequency offset threshold, a difference between frequency offsets between the terminal device and the transmission reception apparatuses is not large. In this case, the terminal device may obtain, through calculation based on the carrier frequency corresponding to each of the plurality of TRSs, the first carrier frequency on which the carrier frequency tracking is to be performed. In this way, the first carrier frequency is determined by comprehensively considering the carrier frequency corresponding to the TRS sent by each transmission reception apparatus, so that the terminal device can track, on the first carrier frequency, the carrier frequency sent by each transmission reception apparatus, to improve the downlink data receiving performance.

When an average value of the plurality of frequency offset residuals is equal to a frequency offset threshold, the terminal device may use a processing manner used when the average value of the plurality of frequency offset residuals is greater than the frequency offset threshold, that is, may select a carrier frequency of one of the plurality of TRSs as the first carrier frequency based on the receive power of each TRS; or the terminal device may use a processing manner used when the average value of the plurality of frequency offset residuals is less than the frequency offset threshold, that is, may obtain, through calculation based on the carrier frequency corresponding to each of the plurality of TRSs, the first carrier frequency on which the carrier frequency tracking is to be performed.

Figure 5A:
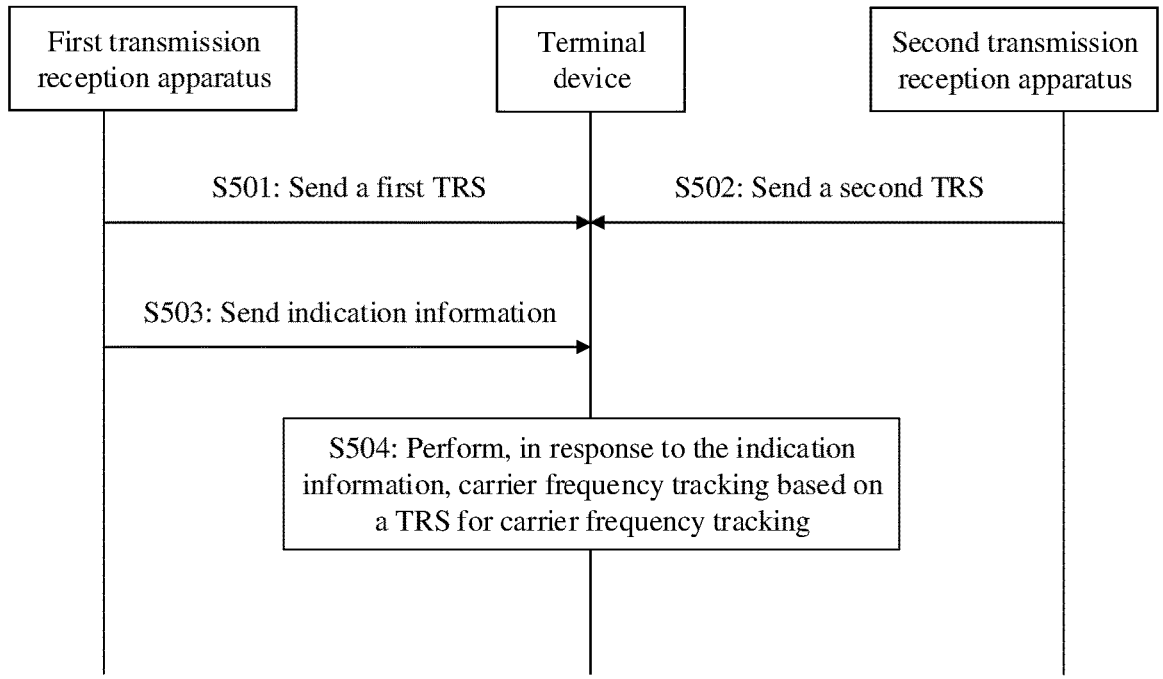
FIG. 5A is another schematic flowchart of a carrier frequency tracking method according to an embodiment.

FIG. 5A is still another schematic flowchart of a carrier frequency tracking method according to an embodiment. In some embodiments, the carrier frequency tracking method may include the following steps.

S501: A first transmission reception apparatus sends a first TRS to a terminal device.

S502: A second transmission reception apparatus sends a second TRS to the terminal device.

Accordingly, the terminal device receives the first TRS from the first transmission reception apparatus and receives the second TRS from the second transmission reception apparatus.

For explanations and descriptions of step S501 and step S502, refer to explanations and descriptions of step S301 and step S302 in the foregoing embodiment. To avoid redundancy, details are not described herein again.

S503: The first transmission reception apparatus sends indication information to the terminal device, where the indication information indicates a TRS for carrier frequency tracking, and the TRS for carrier frequency tracking is the first TRS or the second TRS.

Accordingly, the terminal device receives the indication information from the first transmission reception apparatus.

For example, a network processing device may determine, based on a distance between each transmission reception apparatus and the terminal device, a transmission reception apparatus that sends the TRS for carrier frequency tracking. Optionally, the network processing device may use, as the TRS for carrier frequency tracking, a TRS sent by a transmission reception apparatus closest to the terminal device. This can improve downlink data receiving performance of the terminal device. After determining the TRS for carrier frequency tracking, a BBU controls the first transmission reception apparatus to send the indication information to the terminal device.

The first transmission reception apparatus may send RRC signaling, media access control control element (MAC CE) signaling, or downlink control information (DCI) signaling to the terminal. The RRC signaling, the MAC CE signaling, or the DCI signaling includes the indication information.

Accordingly, the terminal receives the RRC signaling, the MAC CE signaling, or the DCI signaling from the first transmission reception apparatus, to obtain the indication information in the RRC signaling, the MAC CE signaling, or the DCI signaling.

It should be noted that, in this embodiment, alternatively, the second transmission reception apparatus may send indication information, or the second transmission reception apparatus may send RRC signaling, MAC CE signaling, or DCI signaling that includes indication information.

Optionally, the indication information includes a TRS index, a channel state information reference signal (CSI-RS) resource, or a TRS resource identifier (ID).

In this embodiment, the network processing device may determine the TRS for carrier frequency tracking, and then the network processing device sends the indication information to the terminal device through at least one of the first transmission reception apparatus and the second transmission apparatus. A BBU of an SFN cell is deployed in the network processing device.

S504: The terminal device performs, in response to the indication information, carrier frequency tracking based on the TRS for carrier frequency tracking.

In this way, the terminal device can select, from a plurality of received TRSs, a TRS that is indicated by indication information sent by a transmission reception apparatus on a network side and that is for carrier frequency tracking, so that the terminal device can perform carrier frequency tracking based on an appropriate carrier frequency.

In an example, step S503 may be performed before step S501 and step S502. In another example, step S503 may be performed after step S501 and step S502. An execution sequence of steps S501 to S503 is not limited in this embodiment.

It should be noted that the carrier frequency tracking method in this embodiment is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the plurality of transmission reception apparatuses sends TRSs to the terminal, each transmission reception apparatus is configured to send one TRS to the terminal device, and time-frequency resources occupied by the TRSs sent by the transmission reception apparatuses are different. The terminal device may receive, on the different time-frequency resources, the TRSs sent by all of the plurality of transmission reception apparatuses, to obtain a plurality of TRSs.

Then, the terminal device determines, based on the plurality of TRSs, a first carrier frequency on which carrier frequency tracking is to be performed, and performs carrier frequency tracking based on the first carrier frequency.

In some optional embodiments, the indication information includes DCI. After determining the TRS for carrier frequency tracking, the network processing device sends the indication information through a transmission reception apparatus corresponding to the TRS for carrier frequency tracking. For example, if the TRS for carrier frequency tracking is the first TRS, the first transmission reception apparatus sends the indication information to the terminal device. Alternatively, if the TRS for carrier frequency tracking is the second TRS, the second transmission reception apparatus sends the indication information to the terminal device. In this way, a case in which the indication information directly includes related information indicating the carrier frequency tracking can be avoided, so that wireless transmission resources can be saved.

Figure 5B:
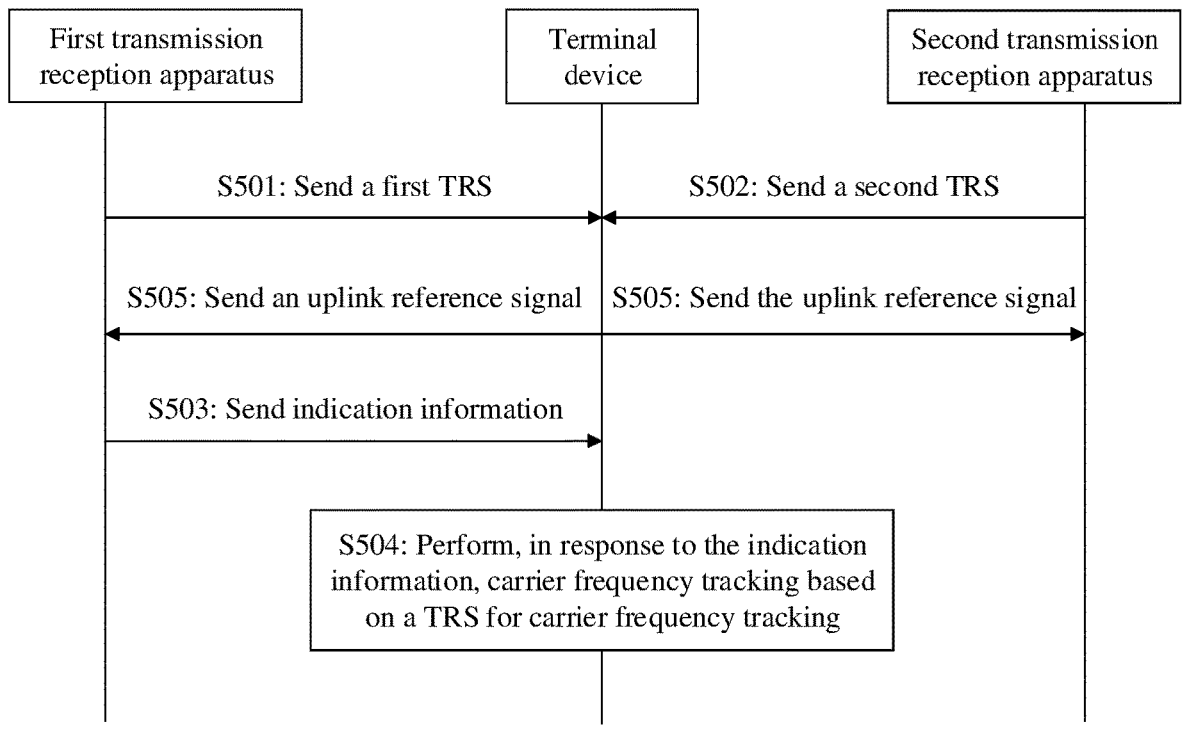
FIG. 5B is another schematic flowchart of a carrier frequency tracking method according to an embodiment.

FIG. 5B is still another schematic flowchart of a carrier frequency tracking method according to an embodiment. Based on the embodiment corresponding to FIG. 5A, in some embodiments, the carrier frequency tracking method further includes the following step:

S505: The terminal device sends an uplink reference signal.

The terminal device sends the uplink reference signal, and each transmission reception apparatus in an SFN cell can receive the uplink reference signal.

Accordingly, the first transmission reception apparatus receives the uplink reference signal sent by the terminal device. The second transmission reception apparatus receives the uplink reference signal sent by the terminal device.

In an optional embodiment, reference signal received power of the uplink reference signal at the first transmission reception apparatus and reference signal received power of the uplink reference signal at the second transmission reception apparatus are for determining the tracking reference signal for carrier frequency tracking.

The network processing device may determine, based on first receive power of the uplink reference signal received by the first transmission reception apparatus and second receive power of the uplink reference signal received by the second transmission reception apparatus, the TRS for carrier frequency tracking, and then the first transmission reception apparatus or the second transmission reception apparatus sends the indication information, to indicate the TRS for carrier frequency tracking. A BBU of the SFN cell is deployed in the network processing device.

Transmit power of uplink reference signals received by transmission reception apparatuses is the same. However, a path loss is caused in a transmission process of uplink power. Positions of the transmission reception apparatuses are different. Transmission paths and path losses of the uplink reference signals received by the transmission reception apparatuses are different. Therefore, receive power of the uplink reference signals received by the transmission reception apparatuses is different. In this case, the BBU may determine, based on the receive power of the uplink reference signals received by the transmission reception apparatuses, to use the TRS sent by the first transmission reception apparatus or the TRS sent by the second transmission reception apparatus as the TRS for carrier frequency tracking. For example, the BBU may select, as the TRS for carrier frequency tracking, a TRS sent by a transmission reception apparatus that receives an uplink reference signal with highest receive power. In this way, a TRS sent by a transmission reception apparatus can be selected as the TRS for carrier frequency tracking, where a path loss between the transmission reception apparatus and the terminal device is the smallest. A smaller path loss indicates higher signal strength. In this way, the terminal device can perform carrier frequency tracking based on a carrier frequency with highest signal strength.

When the first transmission reception apparatus and the second transmission reception apparatus are deployed on a same network device, reference may be made to a scenario shown in FIG. 1B. The BBU of the SFN cell is deployed on the network device. The BBU obtains the uplink reference signal received by the first transmission reception apparatus and the uplink reference signal received by the second transmission reception apparatus, and determines, based on the reference signal received power of the uplink reference signal received by the first reception apparatus and the reference signal received power of the uplink reference signal received by the second reception apparatus, the tracking reference signal for carrier frequency tracking.

When the first transmission reception apparatus and the second transmission reception apparatus are deployed on different network devices, reference may be made to a scenario shown in FIG. 1C. The first transmission reception apparatus and the second transmission reception apparatus are connected to a same network device, and the BBU of the SFN cell is deployed on the same network device. After receiving the uplink reference signal, the first reception apparatus transmits the received uplink reference signal to the BBU. After receiving the uplink reference signal, the second reception apparatus transmits the received uplink reference signal to the BBU. The BBU obtains the uplink reference signal received by the first transmission reception apparatus and the uplink reference signal received by the second transmission reception apparatus, and determines, based on the reference signal received power of the uplink reference signal received by the first reception apparatus and the reference signal received power of the uplink reference signal received by the second reception apparatus, the tracking reference signal for carrier frequency tracking.

It may be understood that this embodiment is also applicable to a scenario in which an SFN cell includes a plurality of (more than two) transmission reception apparatuses. When the plurality of (more than two) transmission reception apparatuses in the SFN cell receive an uplink reference signal sent by the terminal device, the BBU obtains receive power of the uplink reference signal received by each of the plurality of transmission reception apparatuses, and determines, based on the receive power of the uplink reference signal received by each transmission reception apparatus, a TRS sent by one of the plurality of transmission reception apparatuses as a TRS for carrier frequency tracking. For example, the BBU selects, as the TRS for carrier frequency tracking, a TRS sent by a transmission reception apparatus that receives an uplink reference signal with highest receive power.

In another optional embodiment, a frequency offset value of the uplink reference signal at the first transmission reception apparatus and a frequency offset value of the uplink reference signal at the second transmission reception apparatus are for determining the tracking reference signal for carrier frequency tracking.

The network processing device may determine a first frequency offset of the uplink reference signal at the first transmission reception apparatus based on the uplink reference signal received by the first transmission reception apparatus and determine a second frequency offset of the uplink reference signal at the second transmission reception apparatus based on the uplink reference signal received by the second transmission reception apparatus. Then, the TRS for carrier frequency tracking is determined based on the first frequency offset and the second frequency offset, and then the first transmission reception apparatus or the second transmission reception apparatus sends the indication information, to indicate the TRS for carrier frequency tracking. A BBU of the SFN cell is deployed in the network processing device.

The BBU may select, based on the first frequency offset and the second frequency offset, a TRS sent by a transmission reception apparatus as the TRS for carrier frequency tracking, where a frequency offset between the transmission reception apparatus and the terminal device is smaller. For example, when the BBU determines, based on the first frequency offset and the second frequency offset, that a frequency offset between the terminal device and the first transmission reception apparatus is the smallest, the BBU may determine that the first TRS sent by the first transmission reception apparatus is the TRS for carrier frequency tracking.

Alternatively, the BBU may perform, based on the first frequency offset, pre-compensation on a carrier frequency on which the first transmission reception apparatus sends downlink data, and determine that the TRS for carrier frequency tracking is the first TRS. In this way, a frequency offset of the downlink data received by the terminal device is 0, to improve data receiving and demodulation performance of the terminal device.

Optionally, alternatively, the BBU may perform, based on the second frequency offset, pre-compensation on a carrier frequency on which the second transmission reception apparatus sends downlink data, and determine that the TRS for carrier frequency tracking is the second TRS.

After determining the TRS for carrier frequency tracking, the BBU performs step S503, to indicate the TRS used by the terminal device to perform carrier frequency tracking. In this way, the terminal device determines, based on the indication information, the TRS for carrier frequency tracking, and perform carrier frequency tracking based on the TRS.

When the first transmission reception apparatus and the second transmission reception apparatus are deployed on a same network device, reference may be made to a scenario shown in FIG. 1B. The BBU of the SFN cell is deployed on the network device. The BBU obtains the uplink reference signal received by the first transmission reception apparatus and the uplink reference signal received by the second transmission reception apparatus, and determines, based on the first frequency offset of the uplink reference signal at the first transmission reception apparatus and the second frequency offset of the uplink reference signal at the second transmission reception apparatus, the TRS for carrier frequency tracking.

When the first transmission reception apparatus and the second transmission reception apparatus are deployed on different network devices, reference may be made to a scenario shown in FIG. 1C. The first transmission reception apparatus and the second transmission reception apparatus are connected to a same network device, and the BBU of the SFN cell is deployed on the same network device. After receiving the uplink reference signal, the first reception apparatus transmits the received uplink reference signal to the BBU. After receiving the uplink reference signal, the second reception apparatus transmits the received uplink reference signal to the BBU. The BBU determines, based on the first frequency offset of the uplink reference signal at the first transmission reception apparatus and the second frequency offset of the uplink reference signal at the second transmission reception apparatus, the TRS for carrier frequency tracking.

It may be understood that the carrier frequency tracking method in this implementation is also applicable to a scenario in which an SFN cell includes a plurality of (more than two) transmission reception apparatuses. The first transmission reception apparatus and the second transmission reception apparatus may be understood as any two different transmission reception apparatuses in the plurality of transmission reception apparatuses.

In the scenario in which the SFN cell includes the plurality of (more than two) transmission reception apparatuses, the BBU obtains a frequency offset corresponding to an uplink reference signal received by each of the plurality of transmission reception apparatuses, and determines, based on the frequency offset corresponding to the uplink reference signal received by each transmission reception apparatus, a TRS sent by one of the plurality of transmission reception apparatuses as a TRS for carrier frequency tracking. Optionally, the BBU may perform, based on the frequency offset corresponding to the uplink reference signal received by each transmission reception apparatus, pre-compensation on a carrier frequency on which each transmission reception apparatus sends downlink data to the terminal device, so that a frequency offset of the downlink data received by the terminal device can be 0, to improve data receiving and demodulation performance of the terminal device.

Figure 6:
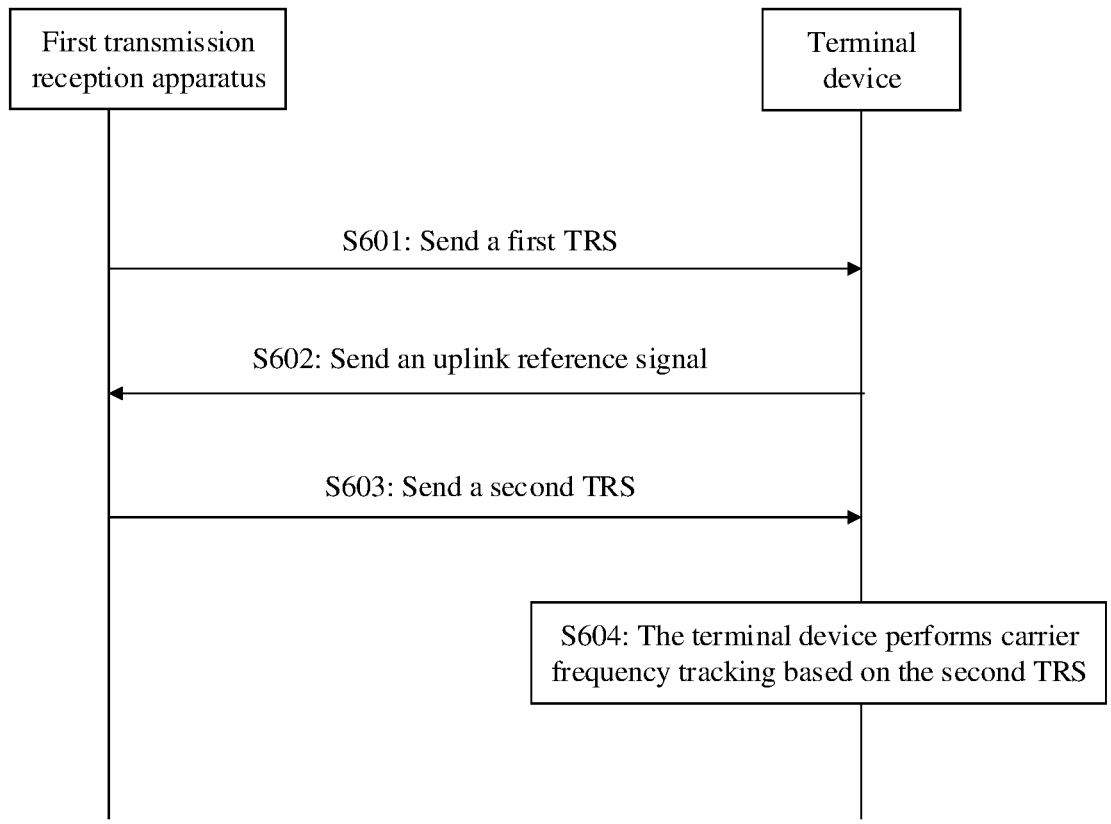
FIG. 6 is another schematic flowchart of a carrier frequency tracking method according to an embodiment.

FIG. 6 is a schematic flowchart of a carrier frequency tracking method according to an embodiment. The carrier frequency tracking method may include the following steps.

S601: A transmission reception apparatus sends a first TRS to a terminal device on a first carrier frequency $f_1$.

The transmission reception apparatus is any one of a plurality of transmission reception apparatuses in an SFN cell.

S602: The terminal device sends an uplink reference signal based on a first receive carrier frequency $F_1$ of the received first TRS.

The terminal device obtains the first receive carrier frequency $F_1$ of the received first TRS, and then performs carrier frequency tracking on the first receive carrier frequency $F_1$. It may be understood that because there is a frequency offset $f_d$ between the transmission reception apparatus and the terminal device, the first receive carrier frequency $F_1 = f_1 - f_d$.

S603: The transmission reception apparatus sends a second TRS to the terminal device on a second carrier frequency $f_2$, where the first TRS and the second TRS occupy different time-frequency resources, the second carrier frequency $f_2 = (3/2 - f_1 - 1/2\, F_2)$, and $F_2$ is a second receive carrier frequency of the uplink reference signal at a second transmission reception apparatus.

$F_2 = f_1 + 2f_d$, and both $F_2$ and $f_1$ are known. In this way, $f_d$ is obtained through calculation based on the second receive carrier frequency $F_2$, and $f_d = (F_2 - f_1)/2$. The second TRS is a carrier frequency on which the carrier frequency tracking is to be performed. The second carrier frequency may be adjusted by using the frequency offset $f_d$, and $f_2 = f_1 - f_d$. With reference to the formula $f_d = (F_2 - f_1)/2$, $f_2$ can be obtained through calculation, and $f_2 = (3/2 f_1 - 1/2 - F_2)$. In this way, a third receive carrier frequency received by the terminal device is the first carrier frequency $f_1$.

S604: The terminal device performs carrier frequency tracking based on the received second TRS.

In the carrier frequency tracking method in this embodiment, the transmission reception apparatus separately sends the first TRS and the second TRS on two different time-frequency resources. In this way, the terminal device can send the uplink reference signal based on the first TRS, so that the transmission reception apparatus accurately obtains the frequency offset between the transmission reception apparatus and the terminal device. The transmission reception apparatus accurately performs pre-compensation on a carrier frequency of the second TRS based on the frequency offset, and then sends the second TRS to the terminal device on an adjusted carrier frequency, so that the terminal device can accurately perform carrier frequency tracking based on the second TRS, to implement carrier frequency tracking without the frequency offset.

It may be understood that the transmission reception apparatus in this embodiment is any one of the plurality of transmission reception apparatuses in the SFN cell. Therefore, according to the carrier frequency tracking method in this embodiment, any transmission reception apparatus in the SFN cell can accurately obtain a frequency offset between the transmission reception apparatus and the terminal device, and adjust, based on the frequency offset, a TRS for carrier frequency tracking, so that the terminal device implements carrier frequency tracking without the frequency offset.

Figure 7:
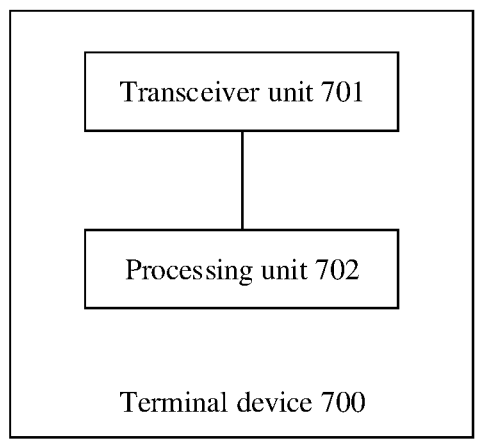
FIG. 7 is a schematic diagram of modules of a terminal device according to an embodiment.

FIG. 7 is a schematic diagram of modules of a terminal device according to an embodiment. The terminal device 700 in this embodiment includes a transceiver unit 701 and a processing unit 702.

The transceiver unit 701 is configured to: receive a first tracking reference signal from a first transmission reception apparatus of a single frequency network cell and receive a second tracking reference signal from a second transmission reception apparatus of the single frequency network cell, where the first tracking reference signal and the second tracking reference signal occupy different time-frequency resources.

The processing unit 702 is configured to perform carrier frequency tracking based on at least one of the first tracking reference signal and the second tracking reference signal.

In this way, the terminal device 700 can obtain a plurality of received tracking reference signals on different time-frequency resources. The terminal device 700 can select, from the plurality of received tracking reference signals, one appropriate tracking reference signal for carrier frequency tracking, and can also obtain, based on the plurality of received tracking reference signals, a to-be-tracked carrier frequency on which the carrier frequency tracking is to be performed, so that the terminal device 700 can more accurately perform carrier frequency tracking, and perform data transmission on the tracked carrier frequency, to improve data transmission performance of the terminal device 700.

In some embodiments, in terms of performing, by the terminal device 700, carrier frequency tracking based on at least one of the first tracking reference signal and the second tracking reference signal, the processing unit 702 is configured to: determine, based on the first tracking reference signal and the second tracking reference signal, a first carrier frequency on which the carrier frequency tracking is to be performed, and perform carrier frequency tracking based on the first carrier frequency.

In some embodiments, in terms of determining, by the terminal device 700 based on the first tracking reference signal and the second tracking reference signal, the first carrier frequency on which the carrier frequency tracking is to be performed, the processing unit 702 is configured to: determine a second carrier frequency corresponding to the first tracking reference signal; determine a third carrier frequency corresponding to the second tracking reference signal; and determine the first carrier frequency based on the second carrier frequency and the third carrier frequency.

In some embodiments, in terms of determining, by the terminal device 700, the first carrier frequency based on the second carrier frequency and the third carrier frequency, the processing unit 702 is configured to: when an absolute value of a difference between the second carrier frequency and the third carrier frequency is less than or equal to a frequency offset threshold, determine the first carrier frequency based on the second carrier frequency and the third carrier frequency.

In some embodiments, in terms of determining, by the terminal device 700 based on the first tracking reference signal and the second tracking reference signal, the first carrier frequency on which the carrier frequency tracking is to be performed, the processing unit 702 is configured to: determine a first signal to interference plus noise ratio corresponding to the first tracking reference signal; determine a second signal to interference plus noise ratio corresponding to the second tracking reference signal; and determine the first carrier frequency based on the first signal to interference plus noise ratio and the second signal to interference plus noise ratio, where the first carrier frequency is a second carrier frequency corresponding to the first tracking reference signal or a third carrier frequency corresponding to the second tracking reference signal.

In some embodiments, in terms of determining, by the terminal device 700, the first carrier frequency based on the first signal to interference plus noise ratio and the second signal to interference plus noise ratio, the processing unit 702 is configured to: determine the second carrier frequency corresponding to the first tracking reference signal; determine the third carrier frequency corresponding to the second tracking reference signal; and when an absolute value of a difference between the second carrier frequency and the third carrier frequency is greater than or equal to a frequency offset threshold, determine the first carrier frequency based on the first signal to interference plus noise ratio and the second signal to interference plus noise ratio.

In some embodiments, the transceiver unit 701 is further configured to send feedback information, where the feedback information is for indicating to silence a transmission reception apparatus other than a transmission reception apparatus corresponding to the first carrier frequency.

In some embodiments, the transceiver unit 701 is further configured to send carrier frequency tracking information, where the carrier frequency tracking information is for feeding back that the terminal device 700 performs carrier frequency tracking based on the first carrier frequency.

In some embodiments, in terms of performing, by the terminal device 700, carrier frequency tracking based on at least one of the first tracking reference signal and the second tracking reference signal, the transceiver unit 701 is configured to: receive indication information from the first transmission reception apparatus or the second transmission reception apparatus, where the indication information indicates a tracking reference signal for carrier frequency tracking, and the tracking reference signal for carrier frequency tracking is the first tracking reference signal or the second tracking reference signal; and perform, in response to the indication information, carrier frequency tracking based on the tracking reference signal for carrier frequency tracking.

In some embodiments, the transceiver unit 701 is further configured to send an uplink reference signal, where reference signal received power of the uplink reference signal at the first transmission reception apparatus and reference signal received power of the uplink reference signal at the second transmission reception apparatus are for determining the tracking reference signal for carrier frequency tracking.

In some embodiments, the transceiver unit 701 is further configured to send an uplink reference signal, where a frequency offset value of the uplink reference signal at the first transmission reception apparatus and a frequency offset value of the uplink reference signal at the second transmission reception apparatus are for determining the tracking reference signal for carrier frequency tracking.

In some embodiments, a distance between the terminal device 700 and the first transmission reception apparatus and a distance between the terminal device 700 and the second transmission reception apparatus are for determining the tracking reference signal for carrier frequency tracking.

In some embodiments, that the terminal device 700 receives indication information from the first transmission reception apparatus or the second transmission reception apparatus includes: The terminal device 700 receives radio resource control signaling, MAC CE signaling, or downlink control information signaling from the first transmission reception apparatus or the second transmission reception apparatus, where the radio resource control signaling, the MAC CE signaling, or the downlink control information signaling includes the indication information.

In some embodiments, the indication information includes a tracking reference signal index, a channel state information reference signal resource, or a tracking reference signal resource identifier.

In some embodiments, the indication information includes downlink control information. When the downlink control information is from the first transmission reception apparatus, the downlink control information indicates that the tracking reference signal for carrier frequency tracking is the first tracking reference signal. Alternatively, when the downlink control information is from the second transmission reception apparatus, the downlink control information indicates that the tracking reference signal for carrier frequency tracking is the second tracking reference signal.

It should be noted that the embodiments of the carrier frequency tracking method are also applicable to the terminal device 700 in this embodiment. To avoid redundancy, details are not described herein again.

Figure 8:
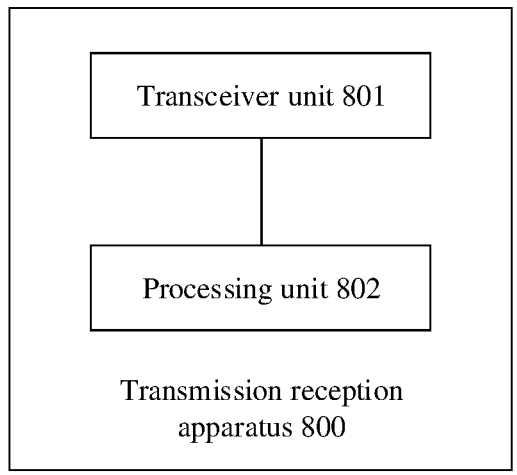
FIG. 8 is a schematic diagram of modules of a transmission reception apparatus according to an embodiment.

FIG. 8 is a schematic diagram of modules of a transmission reception apparatus according to an embodiment. The transmission reception apparatus 800 in this embodiment includes a processing unit 802 and a transceiver unit 801. The processing unit 802 is configured to:

control the transceiver unit 801 to send a first tracking reference signal to a terminal device on a first carrier frequency;

control the transceiver unit 801 to receive an uplink reference signal sent by the terminal device based on a first receive carrier frequency, where the first receive carrier frequency is a carrier frequency of the first tracking reference signal at the terminal device; and control the transceiver unit 801 to send a second tracking reference signal to the terminal device on a second carrier frequency based on a second receive carrier frequency of the received uplink reference signal, where the first tracking reference signal and the second tracking reference signal occupy different time-frequency resources, the second tracking reference signal is for carrier frequency tracking, and the second carrier frequency=(3/2 first carrier frequency−1/2 second receive carrier frequency).

In this way, the transmission reception apparatus separately sends the first tracking reference signal and the second tracking reference signal on two different time-frequency resources. In this way, the terminal device can send the uplink reference signal based on the first tracking reference signal, so that the transmission reception apparatus accurately obtains a frequency offset between the transmission reception apparatus and the terminal device. The transmission reception apparatus accurately performs pre-compensation on a carrier frequency of the second tracking reference signal based on the frequency offset, and then sends the second tracking reference signal to the terminal device on an adjusted carrier frequency, so that the terminal device can accurately perform carrier frequency tracking based on the second tracking reference signal, to implement carrier frequency tracking without the frequency offset.

Figure 9:
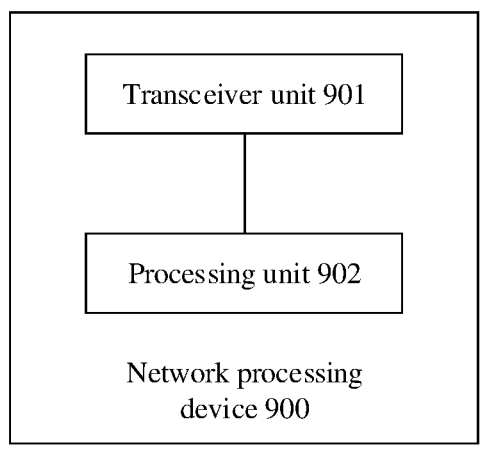
FIG. 9 is a schematic diagram of modules of a network processing device according to an embodiment.

FIG. 9 is a schematic diagram of modules of a network processing device 900 according to an embodiment. The network processing device 900 in this embodiment is used in a single frequency network cell. The network processing device 900 includes a processing unit 902 and a transceiver unit 901. The processing unit 902 is configured to: control the transceiver unit 901 to send a first tracking reference signal to a terminal device through a first transmission reception apparatus, and control the transceiver unit 901 to send a second tracking reference signal to the terminal device through a second transmission reception apparatus, where the first tracking reference signal and the second tracking reference signal occupy different time-frequency resources, and at least one of the first tracking reference signal and the second tracking reference signal is used by the terminal device to perform carrier frequency tracking.

The transceiver unit 901 may include the first transmission reception apparatus and the second transmission reception apparatus, or the transceiver unit 901 is connected to the first transmission reception apparatus and the transceiver unit 901 is connected to the second transmission reception apparatus.

In this way, the terminal device can obtain a plurality of received tracking reference signals on different time-frequency resources. The terminal device can select, from the plurality of received tracking reference signals, one appropriate tracking reference signal for carrier frequency tracking, and can also obtain, based on the plurality of received tracking reference signals, a to-be-tracked carrier frequency on which the carrier frequency tracking is to be performed, so that the terminal device can more accurately perform carrier frequency tracking, and perform data transmission on the tracked carrier frequency, to improve data transmission performance of the terminal device. The network processing device 900 of the single frequency network cell may be a BBU of the single frequency network cell.

In some embodiments, the processing unit 902 is further configured to control the transceiver unit 901 to receive feedback information from the terminal device through the first transmission reception apparatus or the second transmission reception apparatus, where the feedback information is for indicating to silence a transmission reception apparatus other than a transmission reception apparatus corresponding to a first carrier frequency, and the first carrier frequency is a carrier frequency of the first tracking reference signal at the terminal device or a carrier frequency of the second tracking reference signal at the terminal device.

In some embodiments, the processing unit 902 is further configured to control the transceiver unit 901 to receive carrier frequency tracking information from the terminal device, where the carrier frequency tracking information is for feeding back that the terminal device performs carrier frequency tracking based on the first carrier frequency, and the first carrier frequency is determined based on at least one of the first tracking reference signal or the second tracking reference signal.

In some embodiments, the processing unit 902 is further configured to control the transceiver unit 901 to send indication information to the terminal device, where the indication information indicates a tracking reference signal for carrier frequency tracking, and the tracking reference signal for carrier frequency tracking is the first tracking reference signal or the second tracking reference signal.

In some embodiments, the processing unit 902 is further configured to: control the transceiver unit 901 to receive an uplink reference signal from the terminal device through the first transmission reception apparatus, and control the transceiver unit 901 to receive the uplink reference signal through the second transmission reception apparatus, where reference signal received power of the uplink reference signal at the first transmission reception apparatus and reference signal received power of the uplink reference signal at the second transmission reception apparatus are for determining the tracking reference signal for carrier frequency tracking.

In some embodiments, the processing unit 902 is further configured to: control the transceiver unit 901 to receive an uplink reference signal from the terminal device through the first transmission reception apparatus, and control the transceiver unit 901 to receive the uplink reference signal through the second transmission reception apparatus, where a frequency offset value of the uplink reference signal at the first transmission reception apparatus and a frequency offset value of the uplink reference signal at the second transmission reception apparatus are for determining the tracking reference signal for carrier frequency tracking.

In some embodiments, a distance between the terminal device and the first transmission reception apparatus and a distance between the terminal device and the second transmission reception apparatus are for determining the tracking reference signal for carrier frequency tracking.

In some embodiments, in terms of controlling the transceiver unit 901 to send the indication information to the terminal device, the processing unit 902 is configured to:

control the transceiver unit 901 to send radio resource control signaling, MAC CE signaling, or downlink control information signaling to the terminal device, where the radio resource control signaling, the MAC CE signaling, or the downlink control information signaling includes the indication information.

In some embodiments, the indication information includes a tracking reference signal index, a channel state information reference signal resource, or a tracking reference signal resource identifier.

In some embodiments, the indication information includes downlink control information. When the downlink control information is sent to the terminal device through the first transmission reception apparatus, the downlink control information indicates that the tracking reference signal for carrier frequency tracking is the first tracking reference signal. Alternatively, when the downlink control information is sent to the terminal device through the second transmission reception apparatus, the downlink control information indicates that the tracking reference signal for carrier frequency tracking is the second tracking reference signal.

It should be noted that, for the embodiments of the network processing device 900, refer to the embodiments of the carrier frequency tracking method. To avoid redundancy, details are not described herein again.

Figure 10:
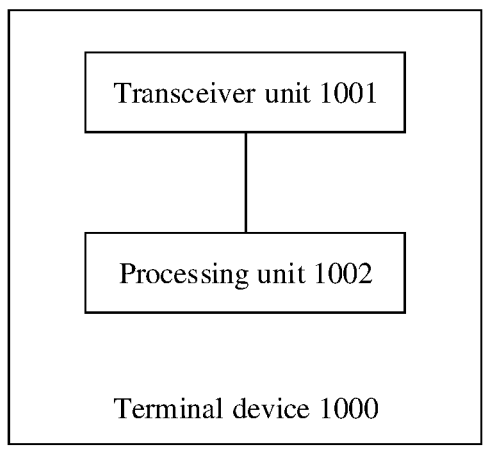
FIG. 10 is another schematic diagram of modules of a terminal device according to an embodiment.

FIG. 10 is a schematic diagram of modules of a terminal device 1000 according to an embodiment. The terminal device 1000 in this embodiment includes a transceiver unit 1001 and a processing unit 1002.

The transceiver unit 1001 is configured to: receive, by a transmission reception apparatus, a first tracking reference signal; send an uplink reference signal to a transmission reception apparatus based on a first receive carrier frequency, where the first receive carrier frequency is a carrier frequency of the first tracking reference signal at the terminal device 1000; and receive a second tracking reference signal sent by the transmission reception apparatus on a second carrier frequency, where the second carrier frequency=(3/2 first carrier frequency−1/2 second receive carrier frequency), the second receive carrier frequency is a carrier frequency of the uplink reference signal at the transmission reception apparatus, and the first tracking reference signal and the second tracking reference signal occupy different time-frequency resources.

The processing unit 1002 is configured to perform carrier frequency tracking based on the second tracking reference signal.

In this way, the terminal device 1000 can send the uplink reference signal based on the first tracking reference signal, so that the transmission reception apparatus accurately obtains a frequency offset between the transmission reception apparatus and the terminal device 1000. The transmission reception apparatus accurately performs pre-compensation on a carrier frequency of the second tracking reference signal based on the frequency offset, and then sends the second tracking reference signal to the terminal device 1000 on an adjusted carrier frequency, so that the terminal device 1000 can accurately perform carrier frequency tracking based on the second tracking reference signal, to implement carrier frequency tracking without the frequency offset.

Figure 11:
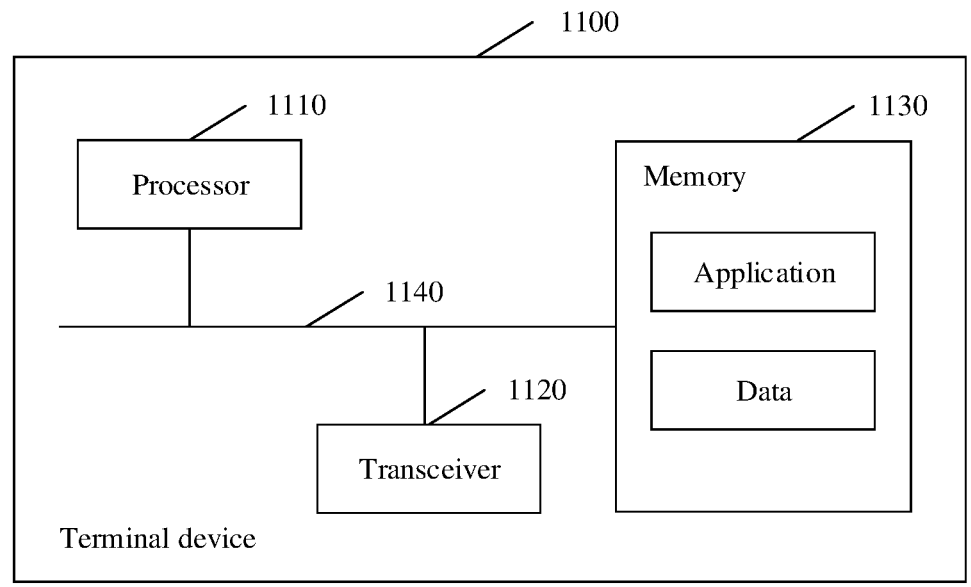
FIG. 11 is a schematic diagram of a structure of a terminal device according to an embodiment.

FIG. 11 is a schematic diagram of a structure of a terminal device 1100 according to an embodiment. The terminal device 1100 includes a processor 1110, a transceiver 1120, and a memory 1130. For example, the processor 1110, the transceiver 1120, and the memory 1130 may be connected to each other through a bus 1140.

The processor 1110 in the terminal device 1100 is configured to read related instructions from the memory 1130, to perform the following operations:

receiving a first tracking reference signal from a first transmission reception apparatus of a single frequency network cell through the transceiver 1120;

receiving a second tracking reference signal from a second transmission reception apparatus of the single frequency network cell through the transceiver 1120, where the first tracking reference signal and the second tracking reference signal occupy different time-frequency resources; and performing carrier frequency tracking based on at least one of the first tracking reference signal and the second tracking reference signal.

For implementations of various operations performed by the terminal device 1100, refer to the terminal device in the foregoing method embodiments. Details are not described herein again.

the processor 1110 in this embodiment may correspond to the processing unit 702 of the terminal device 700 in the foregoing embodiment, or the processing unit 702 of the terminal device 700 in the foregoing embodiment may be deployed in the processor 1110 in this embodiment. The transceiver 1120 in this embodiment may correspond to the transceiver unit 701 of the terminal device 700 in the foregoing embodiment, or the transceiver unit 701 of the terminal device 700 in the foregoing embodiment may be deployed in the transceiver 1120 in this embodiment.

Figure 12:
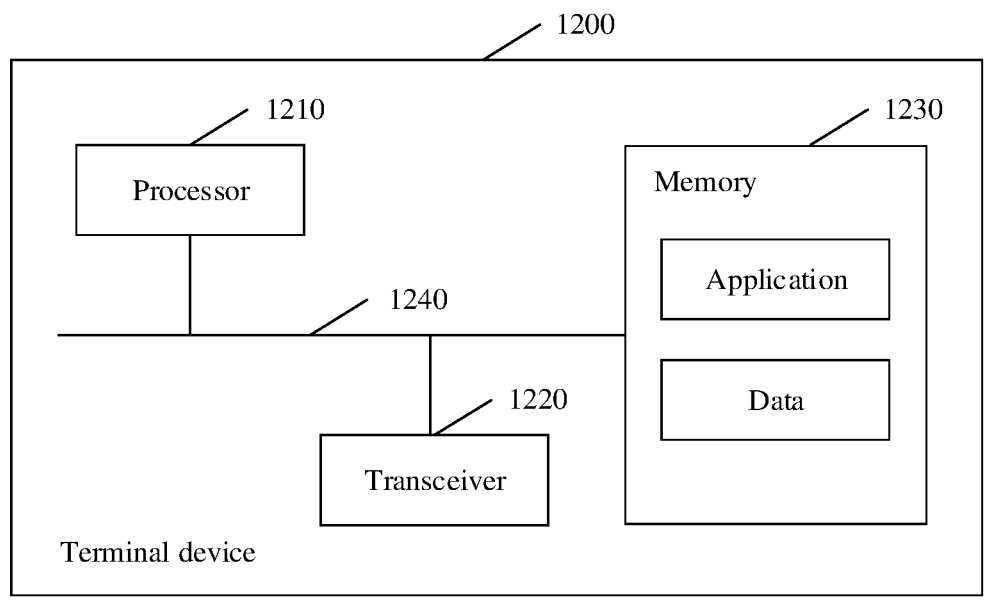
FIG. 12 is another schematic diagram of a structure of a terminal device according to an embodiment.

FIG. 12 is a schematic diagram of a structure of a terminal device 1200 according to an embodiment. The terminal device 1200 includes a processor 1210, a transceiver 1220, and a memory 1230. For example, the processor 1210, the transceiver 1220, and the memory 1230 may be connected to each other through a bus 1240.

The processor 1210 in the terminal device 1200 is configured to read related instructions from the memory 1230, to perform the following operations:

receiving a first tracking reference signal from a transmission reception apparatus;

sending an uplink reference signal to the transmission reception apparatus based on a first receive carrier frequency, where the first receive carrier frequency is a carrier frequency of the first tracking reference signal at the terminal device; and receiving a second tracking reference signal sent by the transmission reception apparatus on a second carrier frequency, where the second carrier frequency=(3/2 first carrier frequency−1/2 second receive carrier frequency), the second receive carrier frequency is a carrier frequency of the uplink reference signal at the transmission reception apparatus, and the first tracking reference signal and the second tracking reference signal occupy different time-frequency resources; and performing carrier frequency tracking based on the second tracking reference signal.

For implementations of various operations performed by the foregoing device 1200, refer to the operations in the method embodiment corresponding to FIG. 6. Details are not described herein again.

The processor 1210 in this embodiment may correspond to the processing unit 1002 of the terminal device 1000 in the foregoing embodiment, or the processing unit 1002 of the terminal device 1000 in the foregoing embodiment may be deployed in the processor 1210 in this embodiment. The transceiver 1220 in this embodiment may correspond to the transceiver unit 1001 of the terminal device 1000 in the foregoing embodiment, or the transceiver unit 1001 of the terminal device 1000 in the foregoing embodiment may be deployed in the transceiver 1220 in this embodiment.

Figure 13:
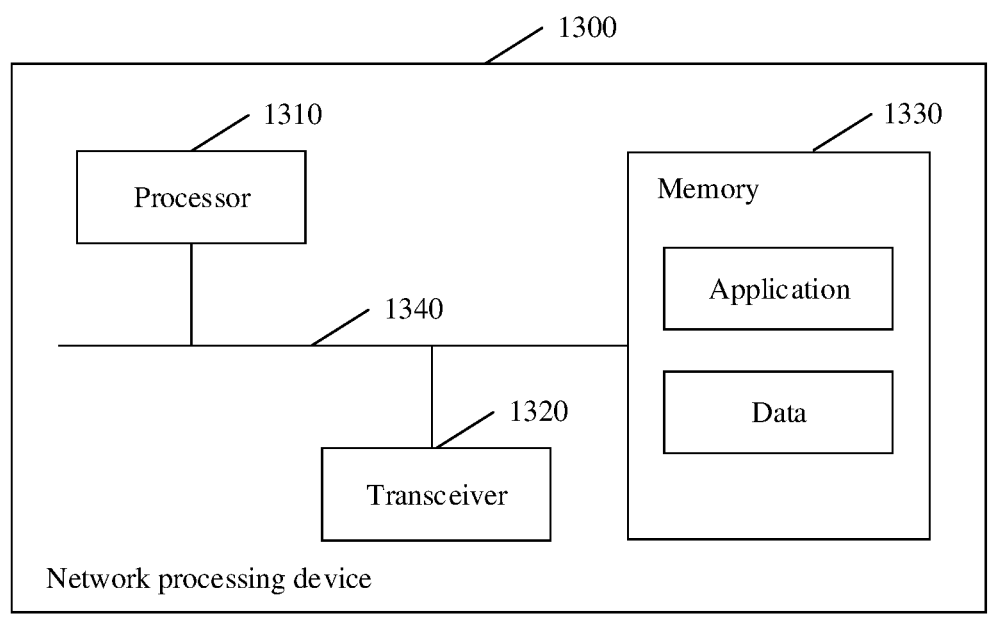
FIG. 13 is a schematic diagram of a structure of a network processing device according to an embodiment.

FIG. 13 is a schematic diagram of a structure of a network processing device 1300 according to an embodiment. The network processing device 1300 includes a processor 1310, a transceiver 1320, and a memory 1330. For example, the processor 1310, the transceiver 1320, and the memory 1330 may be connected to each other through a bus 1340.

The processor 1310 in the network processing device 1300 is configured to read related instructions from the memory 1330, to perform the following operations:

controlling the transceiver 1320 to send a first tracking reference signal to a terminal device through a first transmission reception apparatus; and controlling the transceiver 1320 to send a second tracking reference signal to the terminal device through a second transmission reception apparatus, where the first tracking reference signal and the second tracking reference signal occupy different time-frequency resources; and at least one of the first tracking reference signal and the second tracking reference signal is used by the terminal device to perform carrier frequency tracking. For implementations of various operations performed by the network processing device 1300, refer to the network processing device in the foregoing method embodiments. Details are not described herein again.

The transceiver 1320 may include the first transmission reception apparatus and the second transmission reception apparatus, or the transceiver 1320 is connected to the first transmission reception apparatus and the transceiver 1320 is connected to the second transmission reception apparatus.

The processor 1310 in this embodiment may correspond to the processing unit 902 of the network processing device 900 in the foregoing embodiment, or the processing unit 902 of the network processing device 900 in the foregoing embodiment may be deployed in the processor 1310 in this embodiment. The transceiver 1320 in this embodiment may correspond to the transceiver unit 901 of the network processing device 900 in the foregoing embodiment, or the transceiver unit 901 of the network processing device 900 in the foregoing embodiment may be deployed in the transceiver 1320 in this embodiment.

Figure 14:
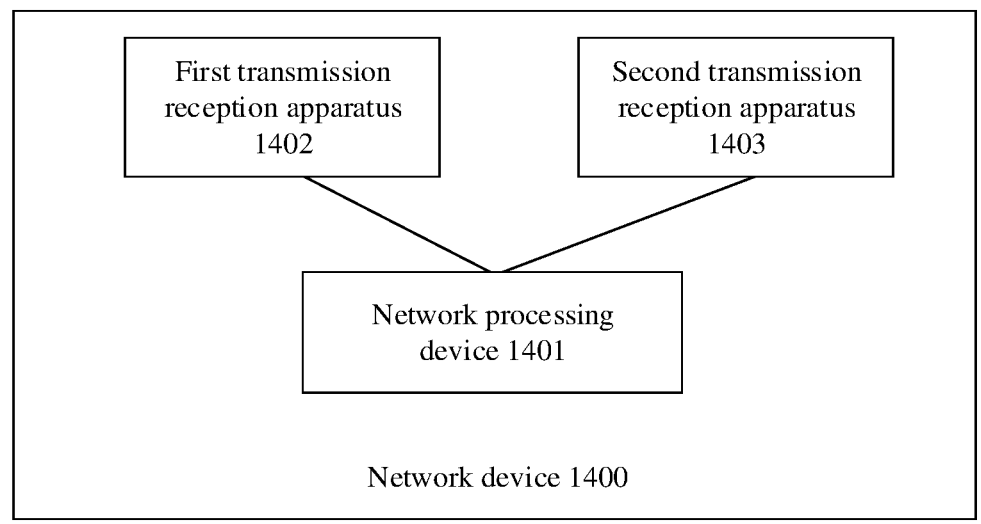
FIG. 14 is a schematic diagram of a structure of a network device according to an embodiment.

FIG. 14 is a schematic diagram of a structure of a network device according to an embodiment. The network device 1400 includes a network processing device 1401, a first transmission reception apparatus 1402, and a second transmission reception apparatus 1403. The network processing device 1401 may be the network processing device 1300 in the embodiment corresponding to FIG. 13. The first transmission reception apparatus 1402 and the second transmission reception apparatus 1403 may be one or more of a remote radio unit (Remote Radio Unit, RRU), a remote radio head (Remote Radio Head, RRH), or a TRP. The first transmission reception apparatus 1402 and the second transmission reception apparatus 1403 are connected to the network processing device 1401. In an embodiment, the network processing device 1401, the first transmission reception apparatus 1402, and the second transmission reception apparatus 1403 belong to a same SFN cell.

Figure 15:
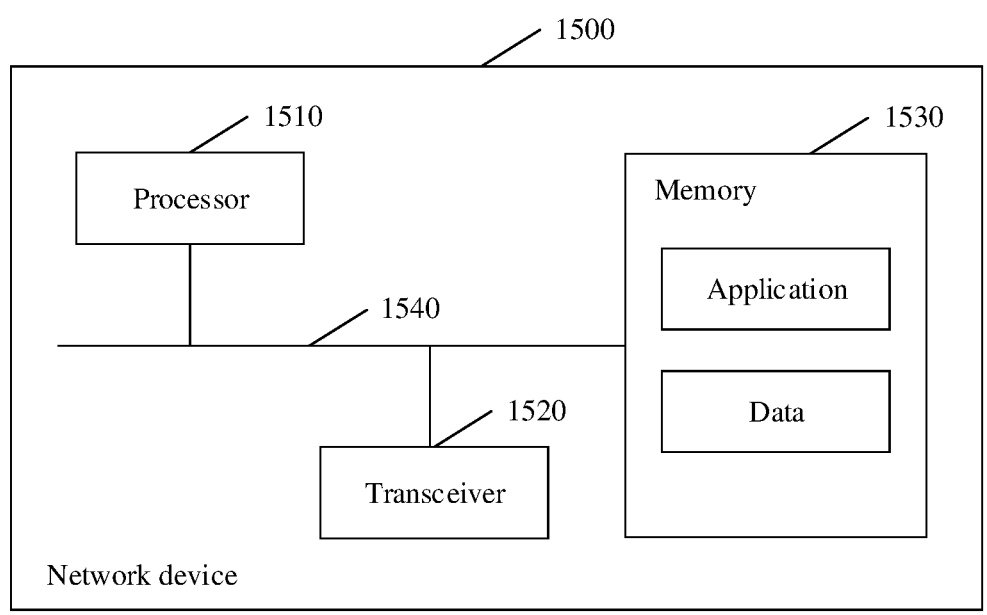
FIG. 15 is another schematic diagram of a structure of a network device according to an embodiment.

FIG. 15 is a schematic diagram of a structure of a network device 1500 according to an embodiment. The network device is used in a single frequency network cell and is connected to a BBU in the single frequency network cell. The network device 1500 includes a processor 1510, a transceiver 1520, and a memory 1530. For example, the processor 1510, the transceiver 1520, and the memory 1530 may be connected to each other through a bus 1540.

The processor 1510 in the network device 1500 is configured to read related instructions from the memory 1530, to perform the following operations:

controlling the transceiver 1520 to send a first tracking reference signal to a terminal device on a first carrier frequency;

controlling the transceiver 1520 to receive an uplink reference signal sent by the terminal device based on a first receive carrier frequency, where the first receive carrier frequency is a carrier frequency of the first tracking reference signal at the terminal device; and controlling the transceiver 1520 to send a second tracking reference signal to the terminal device on a second carrier frequency based on a second receive carrier frequency of the received uplink reference signal, where the first tracking reference signal and the second tracking reference signal occupy different time-frequency resources, the second tracking reference signal is for carrier frequency tracking, and the second carrier frequency=(3/2 first carrier frequency−1/2 second receive carrier frequency).

For implementations of various operations performed by the network device 1500, refer to the transmission reception apparatus in the method embodiment corresponding to FIG. 6. Details are not described herein again.

The processor 1510 in this embodiment may correspond to the processing unit 802 of the network device 800 in the foregoing embodiment, or the processing unit 802 of the network device 800 in the foregoing embodiment may be deployed in the processor 1510 in this embodiment. The transceiver 1520 in this embodiment may correspond to the transceiver unit 801 of the network device 800 in the foregoing embodiment, or the transceiver unit 801 of the network device 800 in the foregoing embodiment may be deployed in the transceiver 1520 in this embodiment.

The embodiments may provide a non-transitory computer-readable storage medium. The non-transitory computer-readable storage medium stores computer instructions. The computer instructions are for instructing a server to perform the information transmission method provided in any one of the foregoing implementations.

It should be further understood that "first", "second", "third", "fourth", and various numbers in this specification are merely used for differentiation for ease of description and are not construed as a limitation to the scope of the embodiments.

It should be noted that the term "and/or" describes an association relationship between associated objects and indicates that three relationships may exist. For example, A and/or B may indicate the following cases: only A exists, both A and B exist, and only B exists. In addition, the character "/" generally indicates an "or" relationship between the associated objects.

It should be understood that sequence numbers of the foregoing processes do not mean execution sequences in various embodiments. The execution sequences of the processes should be determined based on functions and internal logic of the processes but should not be construed as any limitation on the embodiments.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and constraints. A person skilled in the art may use different methods to implement the described functions, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, the apparatus, and the method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one place, or may be distributed on a plurality of network units. Some or all of the units may be selected based on actual requirements to achieve the objectives of the solutions of embodiments.

In addition, function units in embodiments may be integrated into one processing unit, or each of the units may exist alone physically, or two or more units may be integrated into one unit.

When the functions are implemented in a form of a software function unit and sold or used as an independent product, the functions may be stored in a non-transitory computer-readable storage medium. Based on such an understanding, the embodiments may be implemented in a form of a software product. The computer software product is stored in a non-transitory storage medium and includes several instructions for instructing a computer device (which may be a personal computer, a server, or a network device) to perform all or some of the steps of the methods described in embodiments. The foregoing storage medium includes: any medium that can store program code, such as a USB flash drive, a removable hard disk, a read-only memory (ROM), a random access memory (RAM), a magnetic disk, or an optical disc.

A sequence of the steps of the method in the embodiments may be adjusted, combined, or deleted based on an actual requirement.

The modules in the apparatus in the embodiments may be combined, divided, and deleted based on actual requirements.

In conclusion, the foregoing embodiments are merely intended for describing the embodiments, rather than limiting. Although described in detail with reference to the foregoing embodiments, persons of ordinary skill in the art should understand that they may still make modifications without departing from the scope of the solutions of the embodiments.

What is claimed is:

1. A carrier frequency tracking method, comprising:
   receiving, by a terminal device, a first tracking reference signal from a first transmission reception apparatus of a single frequency network cell, said single frequency network cell consisting of a single logical cell having a same physical cell identifier (PCI) throughout the single logical cell;
   receiving, by the terminal device, a second tracking reference signal from a second transmission reception apparatus of the single frequency network cell, wherein the first tracking reference signal and the second tracking reference signal occupy different time-frequency resources; and
   performing, by the terminal device, carrier frequency tracking based on at least one of the first tracking reference signal and the second tracking reference signal;
   wherein performing, by the terminal device, the carrier frequency tracking based on at least one of the first tracking reference signal and the second tracking reference signal further comprises:
   determining, by the terminal device based on the first tracking reference signal and the second tracking reference signal, a first carrier frequency on which the carrier frequency tracking is to be performed; and
   performing carrier frequency tracking based on the first carrier frequency;
   wherein determining, by the terminal device based on the first tracking reference signal and the second tracking reference signal, the first carrier frequency on which the carrier frequency tracking is to be performed further comprises:
   determining, by the terminal device, a second carrier frequency corresponding to the first tracking reference signal;
   determining, by the terminal device, a third carrier frequency corresponding to the second tracking reference signal; and
   determining, by the terminal device, the first carrier frequency based on the second carrier frequency and the third carrier frequency;
   wherein determining, by the terminal device, the first carrier frequency based on the second carrier frequency and the third carrier frequency further comprises:
   when an absolute value of a difference between the second carrier frequency and the third carrier frequency is less than or equal to a frequency offset threshold, determining, by the terminal device, the first carrier frequency based on the second carrier frequency and the third carrier frequency.

2. The carrier frequency tracking method according to claim 1, wherein determining, by the terminal device based on the first tracking reference signal and the second tracking reference signal, the first carrier frequency on which the carrier frequency tracking is to be performed further comprises:
   determining, by the terminal device, a first signal to interference plus noise ratio corresponding to the first tracking reference signal;

determining, by the terminal device, a second signal to interference plus noise ratio corresponding to the second tracking reference signal; and determining, by the terminal device, the first carrier frequency based on the first signal to interference plus noise ratio and the second signal to interference plus noise ratio.

3. The carrier frequency tracking method according to claim 2, when the absolute value of the difference between the second carrier frequency and the third carrier frequency is greater than or equal to a frequency offset threshold, determining, by the terminal device, the first carrier frequency based on the first signal to interference plus noise ratio and the second signal to interference plus noise ratio.

4. The carrier frequency tracking method according to claim 3, further comprising:

sending, by the terminal device, feedback information, wherein the feedback information is for indicating to silence a transmission reception apparatus other than a transmission reception apparatus corresponding to the first carrier frequency.

5. A terminal device, comprising:

a transceiver;

at least one processor; and or more memories coupled to the at least one processor and storing programming instructions for execution by the at least one processor to cause the terminal device to:

receive a first tracking reference signal from a first transmission reception apparatus of a single frequency network cell, said single frequency network cell consisting of a single logical cell having a same physical cell identifier (PCI) throughout the single logical cell;

receive a second tracking reference signal from a second transmission reception apparatus of the single frequency network cell, wherein the first tracking reference signal and the second tracking reference signal occupy different time-frequency resources; and perform carrier frequency tracking based on at least one of the first tracking reference signal and the second tracking reference signal;

wherein the programming instructions, when executed by the at least one processor, further cause the terminal device to:

determine based on the first tracking reference signal and the second tracking reference signal, a first carrier frequency on which the carrier frequency tracking is to be performed, and perform carrier frequency tracking based on the first carrier frequency;

wherein the programming instructions, when executed by the at least one processor, further cause the terminal device to:

determine a second carrier frequency corresponding to the first tracking reference signal;

determine a third carrier frequency corresponding to the second tracking reference signal; and determine the first carrier frequency based on the second carrier frequency and the third carrier frequency;

wherein the programming instructions, when executed by the at least one processor, further cause the terminal device to:

when an absolute value of a difference between the second carrier frequency and the third carrier frequency is less than or equal to a frequency offset threshold, determine the first carrier frequency based on the second carrier frequency and the third carrier frequency.

6. The terminal device according to claim 5, wherein the programming instructions, when executed by the at least one processor, further cause the terminal device to:

determine a first signal to interference plus noise ratio corresponding to the first tracking reference signal;

determine a second signal to interference plus noise ratio corresponding to the second tracking reference signal; and determine the first carrier frequency based on the first signal to interference plus noise ratio and the second signal to interference plus noise ratio.

7. The terminal device according to claim 6, wherein the programming instructions, when executed by the at least one processor, further cause the terminal device to:

when the absolute value of the difference between the second carrier frequency and the third carrier frequency is greater than or equal to a frequency offset threshold, determine the first carrier frequency based on the first signal to interference plus noise ratio and the second signal to interference plus noise ratio.

8. The terminal device according to claim 7, wherein the programming instructions, when executed by the at least one processor, further cause the terminal device to:

send feedback information, wherein the feedback information is for indicating to silence a transmission reception apparatus other than a transmission reception apparatus corresponding to the first carrier frequency.

* * * * *